US012499553B2

(12) United States Patent
Tadano

(10) Patent No.: US 12,499,553 B2
(45) Date of Patent: Dec. 16, 2025

(54) IMAGE PROCESSING APPARATUS AND IMAGE PROCESSING METHOD

(71) Applicant: SONY GROUP CORPORATION, Tokyo (JP)

(72) Inventor: Ryuichi Tadano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 194 days.

(21) Appl. No.: 18/255,117

(22) PCT Filed: Nov. 24, 2021

(86) PCT No.: PCT/JP2021/042882
§ 371 (c)(1),
(2) Date: May 31, 2023

(87) PCT Pub. No.: WO2022/124067
PCT Pub. Date: Jun. 16, 2022

(65) Prior Publication Data
US 2024/0114254 A1  Apr. 4, 2024

(30) Foreign Application Priority Data
Dec. 8, 2020  (JP) ................... 2020-203416

(51) Int. Cl.
*G06T 7/11* (2017.01)
*G06V 10/75* (2022.01)
(Continued)

(52) U.S. Cl.
CPC .............. *G06T 7/11* (2017.01); *G06V 10/751* (2022.01); *G06V 10/82* (2022.01); *H04N 23/955* (2023.01); *G06T 2207/20084* (2013.01)

(58) Field of Classification Search
CPC . G06T 2207/20084; G06T 7/11; G06V 10/14; G06V 10/147; G06V 10/751; G06V 10/82; H04N 23/60; H04N 23/955
See application file for complete search history.

(56) References Cited

U.S. PATENT DOCUMENTS

| 2019/0020789 A1* | 1/2019 | Shimano ............ G02F 1/13306 |
| 2020/0104981 A1* | 4/2020 | Eguchi .................... G06T 5/10 |
| 2025/0173877 A1* | 5/2025 | Cheng ..................... G06T 7/194 |

FOREIGN PATENT DOCUMENTS

| JP | 2019-003609 A | 1/2019 |
| WO | 2017/145348 A1 | 8/2017 |
| WO | 2019/124106 A1 | 6/2019 |

OTHER PUBLICATIONS

Sato, et al., "Action Identification from Lensless Multi-Pinhole Camera", The 23rd Symposium on Image Recognition and Understanding (MIRU2020), 2020.

(Continued)

*Primary Examiner* — Antoinette T Spinks
(74) *Attorney, Agent, or Firm* — CHIP LAW GROUP

(57) ABSTRACT

The present disclosure relates to an image processing apparatus, an image processing method, and a program capable of realizing highly accurate image recognition processing while taking privacy into consideration with a simple configuration. A mask of a lensless camera is convoluted with a weight of a DNN first layer used in image recognition processing using a DNN, and a reconstructed image becomes a processing result of the DNN first layer on the basis of a captured image captured by an image sensor. Accordingly, the restored image becomes the processing result of the DNN first layer and becomes an image difficult for a person to visually recognize as a scene or an object, making it possible to protect the privacy of the image. The (Continued)

present disclosure can be applied to an image recognition apparatus using a lensless camera.

19 Claims, 16 Drawing Sheets

(51) Int. Cl.
*G06V 10/82* (2022.01)
*H04N 23/955* (2023.01)

(56) References Cited

OTHER PUBLICATIONS

Fenimore, et al., "Coded aperture imaging with uniformly redundant arrays", Applied Optics, vol. 17, No. 3, Feb. 1, 1978, pp. 337-347.
Gottesman, et al., "New family of binary arrays for coded aperture imaging", Applied Optics, vol. 28, No. 20, 1989, pp. 4344-4352.
International Search Report and Written Opinion of PCT Application No. PCT/JP2021/042882, issued on Feb. 15, 2022, 08 pages of ISRWO.

* cited by examiner

IMAGE PROCESSING APPARATUS AND IMAGE PROCESSING METHOD

CROSS REFERENCE TO RELATED APPLICATIONS

This application is a U.S. National Phase of International Patent Application No. PCT/JP2021/042882 filed on Nov. 24, 2021, which claims priority benefit of Japanese Patent Application No. JP 2020-203416 filed in the Japan Patent Office on Dec. 8, 2020. Each of the above-referenced applications is hereby incorporated herein by reference in its entirety.

TECHNICAL FIELD

The present disclosure relates to an image processing apparatus, an image processing method, and a program, and in particular, to an image processing apparatus, an image processing method, and a program capable of realizing highly accurate image recognition processing while taking privacy into consideration with a simple configuration.

BACKGROUND ART

A lensless camera in which a mask is placed before an image sensor without an optical block such as a lens, an image is captured in a state in which incident light is modulated by the mask, and signal processing according to a pattern of the mask is applied to the captured image to reconstruct images with various focal lengths has been proposed.

It has been proposed to use a lensless camera for the image recognition processing because it is possible to reconstruct images of a subject at various distances from an image obtained by one shot.

For improvement of recognition accuracy of the image recognition processing, it is essential to improve the image quality of a reconstructed image reconstructed from an image captured by a lensless camera.

Therefore, for example, a technology for dividing a mask into a plurality of areas and individually preparing a mask design and a band pass filter according to a target wavelength range for each area to achieve high image quality of a reconstructed image has been proposed (see PTL 1).

Further, in image recognition processing, it is necessary to take privacy of a person in a captured image into consideration, for an image that is used for person authentication processing.

Therefore, for example, a technology for realizing imaging taking privacy into consideration by utilizing characteristics that an image directly observed on an image sensor is not an image obtained by forming an image of a subject in a multi pinhole array has been proposed (See NPL 1).

CITATION LIST

Patent Literature

[PTL 1]
WO 2019/124106

Non Patent Literature

[NPL 1]
Action Identification from Lensless Multi-Pinhole Camera/ Satoshi Sato, Zhou Changxin, Rasang Pongsaku, Ikki Ishii, Ryota Fujimura, Takayoshi Yamashita, The 23rd Symposium on Image Recognition and Understanding (MIRU2020)

SUMMARY

Technical Problem

However, in a technology of NPL 1, it cannot be said that a pinhole array pattern (mask pattern) is positively devised for privacy protection, and it cannot be said that privacy measures are sufficient since an image can be reconstructed by calibration when the pattern itself is known by a third party.

Further, in the technology of PTL 1, since no particular countermeasures are taken for a boundary portion between adjacent sub-areas, or only a light shielding wall is provided, there is concern that degradation of image quality is caused, and the difficulty in manufacturing is great and costs are high.

Further, since the mask pattern itself is intended to reduce an influence of a diffraction effect due to a difference in wavelength, optimization particularly for subsequent recognition processing is not performed.

Further, in general, when the image recognition processing is realized using a lensless camera, it is common for an image to be reconstructed before processing even though a reconstructed image is not essential in the image recognition processing, and extra operation resources or power is required for the processing.

The present disclosure has been made in view of such circumstances, and in particular, is intended to realize highly accurate image recognition processing talking privacy into consideration with a simpler configuration in image recognition processing using a lensless camera.

Solution to Problem

An image processing apparatus and a program according to an aspect of the present disclosure are an image processing apparatus including: a mask configured to modulate and transmit incident light; an image sensor configured to capture a modulated image based on the incident light modulated by the mask; and a signal processing unit configured to perform signal processing based on a mask pattern of the mask on the modulated image, and a program.

An image processing method according to an aspect of the present disclosure is an image processing method for an image processing apparatus including: a mask configured to modulate and transmit incident light, an image sensor configured to capture a modulated image based on the incident light modulated by the mask, and a signal processing unit configured to apply signal processing based on a mask pattern of the mask to the modulated image, wherein the signal processing unit performs signal processing based on the mask pattern of the mask on the modulated image.

In an aspect of the present disclosure, a modulated image based on incident light modulated by a mask is captured, and signal processing based on a mask pattern of a mask that modulates and transmits incident light is performed on the modulated image.

DESCRIPTION OF EMBODIMENTS

Preferred embodiments of the present disclosure will be described in detail below with reference to the accompanying drawings. In the present specification and drawings, components having substantially the same functional configuration are denoted by the same reference signs, and repeated description thereof will be omitted.

Hereinafter, embodiments for implementing the present technology will be described. The description is given in the following order.

1. Overview of Image Recognition Using Lensless Camera
2. First Embodiment
3. Second Embodiment
4. First Application Example
5. Second Application Example
6. Example of Execution by Software 1. Overview of Image Recognition Using Lensless Camera An overview of the image recognition processing using a lensless camera will first be described with reference to FIG. 1 when an image processing apparatus of the present disclosure that realizes highly accurate image recognition processing while taking privacy into consideration using an image captured by a lensless camera is described.

Figure 1:
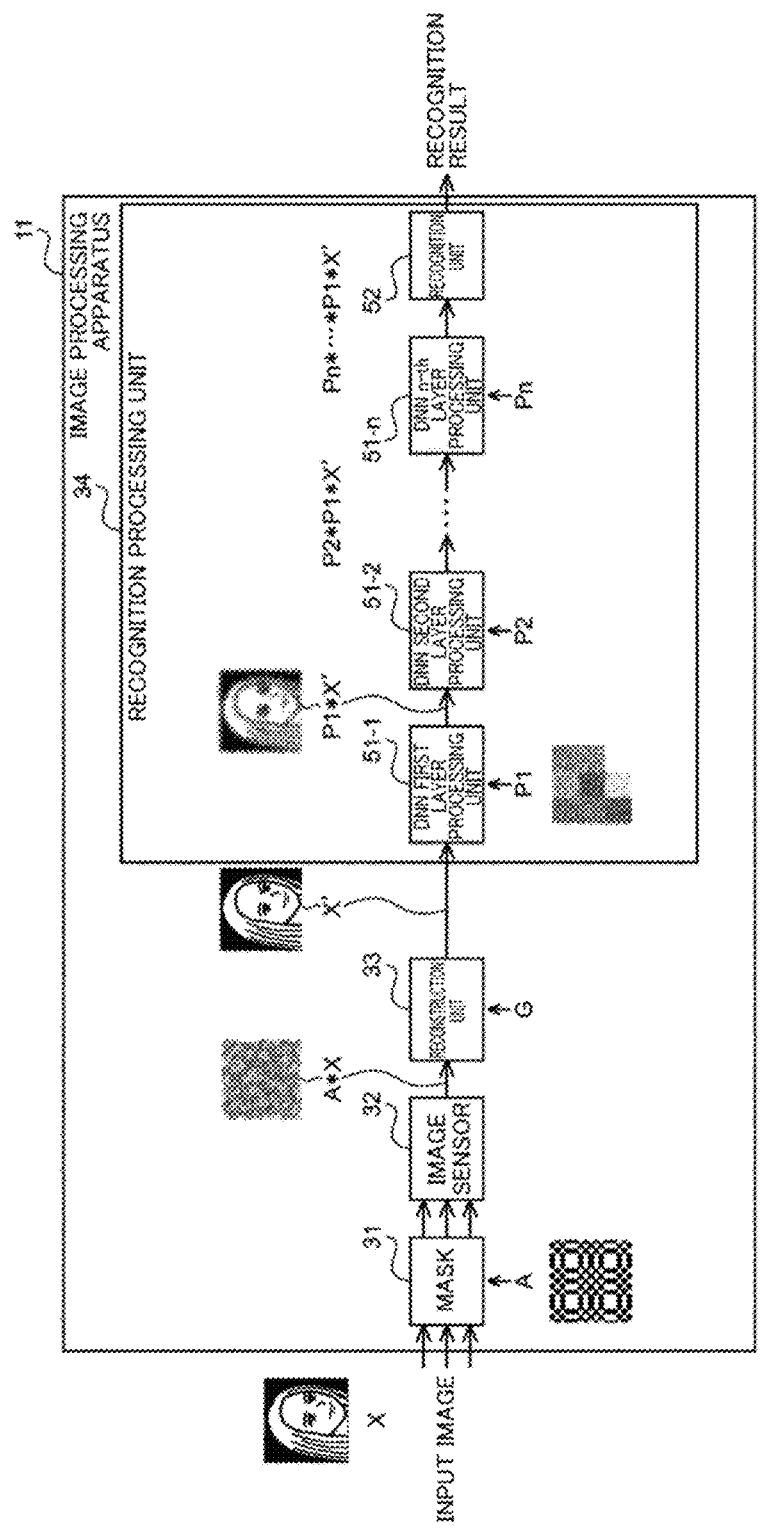
FIG. 1 is a diagram illustrating a configuration example of an image processing apparatus that realizes image recognition processing using lensless imaging.

FIG. 1 illustrates a configuration example of an image processing apparatus illustrating an overview of the image recognition processing using a lensless camera. The image processing apparatus 11 of FIG. 1 includes a mask 31, an image sensor 32, a reconstruction unit 33, and a recognition processing unit 34.

The mask 31, the image sensor 32, and the reconstruction unit 33 constitute an imaging apparatus using lensless imaging, and are components functioning as a so-called lensless camera.

The mask 31 is a plate-shaped component made of a light-shielding material provided before the image sensor 32, and may be configured of, for example, a transmissive area provided with a condensing element configured of a lens, a Fresnel Zone Plate (FZP), or the like for a hole-shaped opening that transmits the incident light, and an opaque area other than the transmissive area shielded from light. Further, the mask 31 may further include an intermediate transmissive area having an arbitrary transmittance (non-binary) between the opening and a light shielding portion, or may be configured of a diffraction grating or the like.

When the mask 31 receives light as incident light from a subject surface (actually, a surface on which radiation light from a three-dimensional subject is emitted), the mask 31 transmits the incident light through the transmissive area, thereby modulating the incident light from the subject surface as a whole to convert the incident light into modulated light, and causing the converted modulated light to be received and imaged by the image sensor 32.

The image sensor 32 is configured of a complementary metal oxide semiconductor (CMOS) image sensor or a charge coupled device (CCD) image sensor, and captures an image composed by modulated light obtained by modulating the incident light from the subject surface using the mask 31, and outputs an image consisting of a signal on a pixel-by-pixel basis to the reconstruction unit 33 as a captured image.

The mask 31 has a size that includes at least an entire surface of the image sensor 32, and is basically configured so that the image sensor 32 receives only modulated light that has been modulated through the mask 31.

Further, the transmissive area formed in the mask 31 has a size at least equal to a pixel size of the image sensor 32 or a size larger than the pixel size (a size equal to or larger than the pixel size). Further, a gap with a minute size is provided between the image sensor 32 and the mask 31.

<Principle of Imaging in Lensless Camera>

Here, a principle of imaging in the lensless camera will be described. For example, as illustrated in an upper left part of FIG. 2, it is assumed that incident light from point light sources PA, PB, and PC on the subject surface is transmitted through the mask 31 and received as light rays with light intensities a, b, and c at positions Pa, Pb, and Pc on the image sensor 32.

Figure 2:
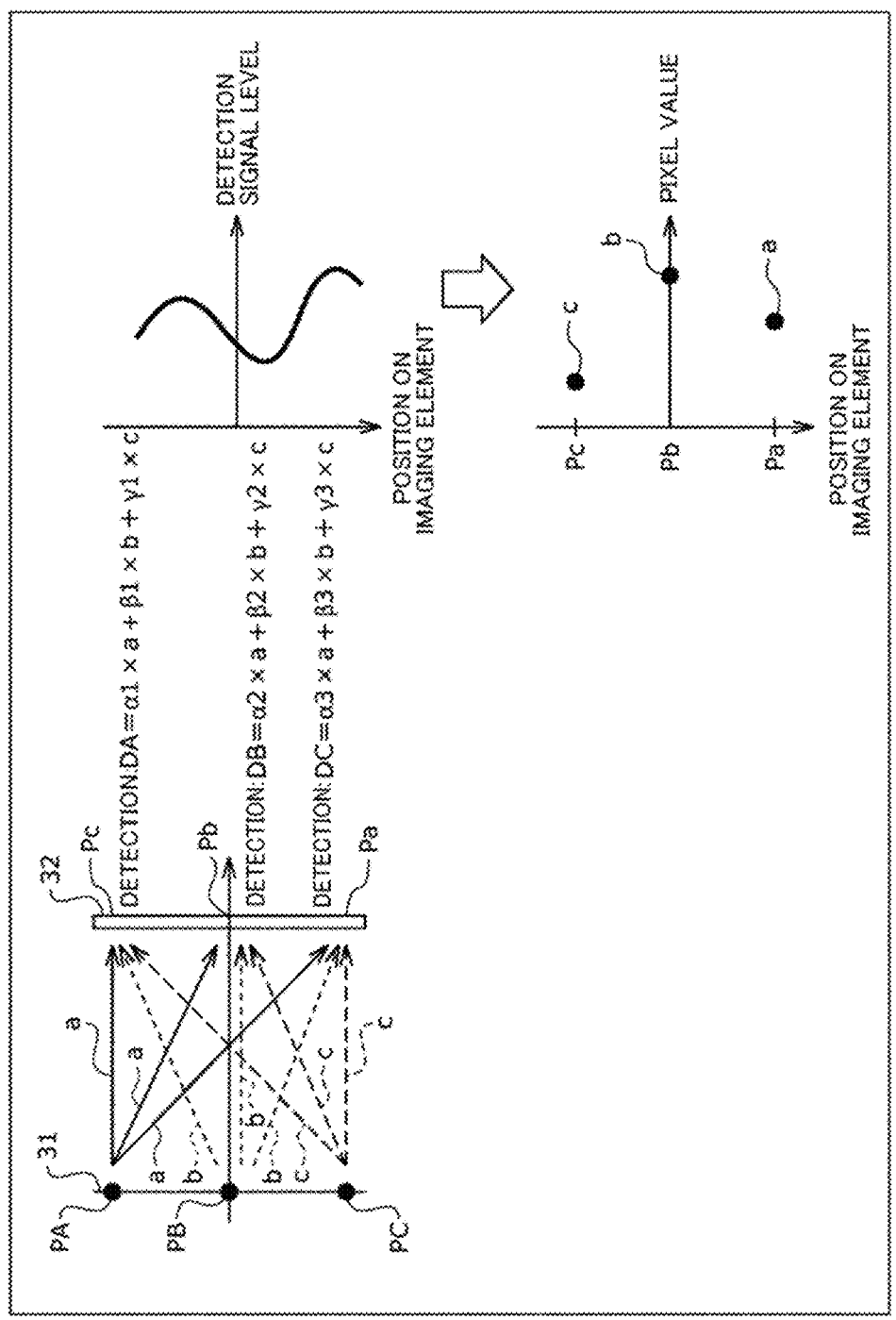
FIG. 2 is a diagram illustrating a principle of imaging in a lensless camera.

As illustrated in the upper left part of FIG. 2, the detection sensitivity of each pixel has directivity according to an incidence angle by the incident light being modulated by the transmissive area set on the mask 31. The detection sensitivity of each pixel having incidence angle directivity here makes light reception sensitivity characteristics according to the incidence angle of the incident light different depending on an area on the image sensor 32.

That is, when it is assumed that a light source that constitutes the subject surface is a point light source, light rays with the same light intensity emitted from the same point light source are incident on the image sensor 32, but the incidence angle changes for each area on an imaging surface of the image sensor 32 due to modulation in the mask 31. Since the incidence angle of the incident light is changed due to the mask 31 depending on the area on the image sensor 32, the light reception sensitivity characteristics, that is, the incidence angle directivity is obtained, and thus even when light rays have the same light intensity, the light ray is detected with different sensitivities for the respective areas on the image sensor 32 due to the mask 31 provided before the imaging surface of the image sensor 32, and detection signals at different detection signal levels are detected for the respective areas.

More specifically, detection signal levels DA, DB, and DC of the pixels at the positions Pa, Pb, and Pc on the image sensor 32 are expressed by Equations (1) to (3) below, respectively, as illustrated in an upper right part of FIG. 2. Equation (1) to (3) in FIG. 2 are reversed in a vertical relationship with the positions Pa, Pb, and Pc on the image sensor 32 in FIG. 2.

[Math. 1]

$$DA = \alpha 1 \times a + \beta 1 \times \gamma 1 \times c \quad (1)$$

[Math. 2]

$$DB = \alpha 2 \times a + \beta 2 \times \gamma 2 \times c \quad (2)$$

[Math. 3]

$$DC = \alpha 3 \times a + \beta 3 \times \gamma 3 \times c \quad (3)$$

Here, $\alpha 1$ is a coefficient for a detection signal level a that is set depending on the incidence angle of the light ray from the point light source PA on the subject surface to be restored at the position Pa on the image sensor 32.

$\beta 1$ is a coefficient for a detection signal level b that is set depending on the incidence angle of the light ray from the point light source PB on the subject surface to be restored at the position Pa on the image sensor 32.

Further, $\gamma 1$ is a coefficient for a detection signal level c that is set depending on the incidence angle of the light ray from the point light source PC on the subject surface to be restored at the position Pa on the image sensor 32.

Therefore, $(\alpha 1 \times a)$ of the detection signal level DA indicates a detection signal level due to the light ray from the point light source PA at the position Pa.

Further, $(\beta 1 \times b)$ of the detection signal level DA indicates a detection signal level of the light ray from the point light source PB at the position Pa.

Further, $(\gamma 1 \times c)$ of the detection signal level DA indicates a detection signal level by the light ray from the point light source PC at the position Pa.

Therefore, the detection signal level DA is expressed as a sum of multiplications of respective components of the point light sources PA, PB, and PC at the position Pa by respective coefficients $\alpha 1$, $\beta 1$, and $\gamma 1$. Hereinafter, the coefficients $\alpha 1$, $\beta 1$, and $\gamma 1$ are collectively referred to as a set of coefficients.

Similarly, a set of coefficients $\alpha 2$, $\beta 2$, and $\gamma 2$ for the detection signal level DB at the point light source Pb correspond to the set of coefficients $\alpha 1$, $\beta 1$, and $\gamma 1$ for the detection signal level DA at the point light source PA, respectively. Further, a set of coefficients $\alpha 3$, $\beta 3$, and $\gamma 3$ for the detection signal level DC at the point light source Pc corresponds to the set of coefficients $\alpha 1$, $\beta 1$, and $\gamma 1$ for the detection signal level DA at the point light source Pa.

However, the detection signal levels of the pixels at the positions Pa, Pb, and Pc are values expressed by a sum of products of the light intensities a, b, and c of the light rays emitted from the respective point light sources PA, PB, and PC, and the coefficients. Therefore, since each of the detection signal levels is a mixture of the light intensities a, b, and c of the light rays emitted from the respective point light sources PA, PB, and PC, the detection signal level is different from a formed image of a subject.

That is, the set of coefficients $\alpha 1$, $\beta 1$, and $\gamma 1$, the set of coefficients $\alpha 2$, $\beta 2$, and $\gamma 2$, the set of coefficients $\alpha 3$, $\beta 3$, and $\gamma 3$, and the detection signal levels DA, DB, and DC are used to construct simultaneous equations, these are solved for the light intensities a, b, and c, and pixel values of the respective positions Pa, Pb, and Pc are obtained as illustrated in a lower right part of FIG. 2. Accordingly, a restored image (final image), which is a set of pixel values, is reconstructed and restored.

Further, when a distance between the image sensor 32 and the subject surface illustrated in the upper left part of FIG. 2 is changed, the set of coefficients $\alpha 1$, $\beta 1$, and $\gamma 1$, the set of coefficients $\alpha 2$, $\beta 2$, and $\gamma 2$, the set of coefficients $\alpha 3$, $\beta 3$, and $\gamma 3$ change, and this change in sets of coefficients makes it possible to reconstruct the restored image (the final image) of the subject surfaces at various distances.

Therefore, it is possible to reconstruct images of the subject surface at various distances from an imaging position by changing the sets of coefficients to correspond to various distances through one imaging.

As a result, in the imaging using a lensless camera realized by the mask 31, the image sensor 32, and the reconstruction unit 33 in FIG. 1, it is not necessary to be conscious of a so-called blurring phenomenon in which imaging is performed in a state in which a focus is shifted in imaging in a general imaging apparatus using a lens, and it is possible to reconstruct images of the subject surface at various distances after imaging by changing a set of coefficients depending on a distance when imaging is performed so that a subject desired to be imaged within a field of view is included.

Since the detection signal level illustrated in the upper right part of FIG. 2 is not the detection signal level corresponding to the image in which an image of the subject is formed, the detection signal level becomes a simple observed value, not a pixel value, and an image is formed of the observed values. Further, since the detection signal level illustrated in a lower right part of FIG. 2 consists of signal values for respective pixels corresponding to the image in which the image of the subject is formed, and is a value of each pixel of the restored image (final image), the detection signal level becomes a pixel value.

Such a configuration enables the mask 31, the image sensor 32, and the reconstruction unit 33 to function as a so-called lensless camera. As a result, since an imaging lens is not an essential component, it is possible to reduce a height of the imaging apparatus, that is, to reduce a thickness in an incidence direction of light in a configuration that realizes an imaging function. Further, it is possible to reconstruct and restore the final image (the restored image) on the subject surface at various distances by variously changing the sets of coefficients.

Hereinafter, an image captured by the image sensor 32 before reconstruction is simply referred to as a captured image, and an image being subjected to signal processing is referred to as a final image (restored image). Therefore, from one captured image, it is possible to reconstruct the images on the subject surface at various distances as the final image by variously changing the above-described sets of coefficients.

Here, the description of FIG. 1 is referred back to. The reconstruction unit 33 includes the above-described sets of coefficients, and reconstructs the final image (the restored image) on the basis of the captured image captured by the image sensor 32 using the set of coefficients according to a distance from the imaging position to the subject surface, and outputs the final image (the restored image) to the recognition processing unit 34.

The recognition processing unit 34 performs the image recognition processing using a deep neural network (DNN) on the basis of the final image supplied from the reconstruction unit 33, and outputs a recognition result.

More specifically, the recognition processing unit 34 includes a DNN first layer processing unit 51-1, a DNN second layer processing unit 51-2, ..., a DNN n-th layer processing unit 51-n, and a recognition unit 52.

Each of the DNN first layer processing unit 51-1, the DNN second layer processing unit 51-2, ..., the DNN n-th layer processing unit 51-n executes convolution processing of each layer including n layers constituting each DNN and output a result thereof to a later stage, and the DNN n-th layer processing unit 51-n that has executed an n-th layer processing as a final layer outputs a convolution result to the recognition unit 52.

The recognition unit 52 recognizes an object on the basis of a convolution result of an n-th layer supplied from the DNN n-th layer processing unit 51-n, and outputs a recognition result.

(Recognition Processing of Recognition Processing Unit)

Here, an input image when a distance from the imaging position to the subject is set to a predetermined distance is selected as an input image X and modulated by the mask 31 of the mask pattern A, an influence of diffraction, noise, or the like is ignored, and a captured image, which is an image observed by the image sensor 32, is represented by A*X. * represents convolution.

Further, when a restoration matrix configured of the above-described set of coefficients for reconstructing the captured image A*X modulated by the mask 31 of the mask pattern A into a final image (a restored image) X' is G, the reconstructed final image (restored image) X' is expressed by Equation (4) below.

[Math. 4]

$$X'=G*A*X\approx X \quad (4)$$

When the DNN first layer processing unit 51-1 performs a convolution operation with a weight P1 on the final image (the restored image) X', a processing result of the DNN first layer that is a processing result of the DNN first layer processing unit 51-1 is expressed by Equation (5) below.

[Math. 5]

$$\text{Processing result of } DNN \text{ first layer}=P1*X'=P1*G*A*X \quad (5)$$

Thereafter, similarly, in the DNN second layer processing unit 51-2, a convolution operation with a weight P2 is performed on the processing result of the DNN first layer processing unit 51-1, a convolution operation with a weight P3 is performed on the processing result of the DNN first layer processing unit 51-2 in the DNN third layer processing unit 51-3, and then, a convolution operation of a weight Pn is performed on a processing result of the DNN (n-1) layer processing unit 51-(n-1)-th in the DNN n-th layer processing unit 51-n.

Finally, a processing result P1*P2* ... Pn*X' is output as the processing result of the DNN n-th layer processing unit 51-n to the recognition unit 52, and the recognition unit 52 performs object recognition processing based on the processing result P1*P2* ... Pn*X'.

Here, it is assumed that the mask pattern of the mask 31 is a modified uniformly redundant arrays (MURA) pattern, but the mask pattern may be any of other patterns, such as a uniformly redundant arrays (URA) pattern. These patterns have a repetitive structure called a cyclic coded mask, and are often used in the world of coded aperture imaging that reconstructs a scene using a mask.

For details of the MURA pattern, see E. E. Fenimore and T. M. Cannon, "Coded aperture imaging with uniformly redundant arrays," Applied Optics, vol. 17, No. 3, pp. 337-347, 1978.

Further, for details of the URA pattern, see S. R. Gottesman and E. Fenimore, "New family of binary arrays for coded aperture imaging," Applied Optics, vol. 28, No. 20, pp. 4344-4352, 1989.

As described above, in the object recognition processing using a lensless camera described above, the final image (the restored image) X' corresponding to the input image X is reconstructed before the recognition processing unit 34, and then, recognition processing is performed in the recognition processing unit 34.

As described above, the final image (the restored image) is obtained by restoring the captured image A*X modulated by the mask 31 to an image that can be visually recognized by humans using a restoration matrix G.

However, in the processing of the recognition processing unit 34, it is not essential that an image that is an input of the recognition processing is the image that can be visually recognized by the humans as long as information necessary for the recognition processing is included.

Therefore, in the recognition processing using a lensless camera, processing of restoration into the final image (the restored image) in the reconstruction unit 33 is not essential processing.

Further, when the recognition processing in the recognition processing unit 34 is, for example, for a facial image of a person such as face authentication, the input image is necessarily the facial image of the person, and thus, the reconstruction of the final image (the restored image) makes it necessary to take privacy protection into consideration.

Therefore, the facial image as the reconstructed final image (restored image), or the like is used for recognition processing and then is discarded, or special management for preventing the image from being exposed to a third party using any means for privacy protection is necessary.

Therefore, in the present disclosure, the mask pattern constituting the mask 31 is obtained by convoluting the mask pattern A described above with the weight P1 that is used in the convolution operation of the DNN first layer processing unit 51-1, and the reconstruction unit 33 reconstructs an image P1*X' obtained by convoluting the input image X with the weight P1 as the final image (restored image).

With such a configuration, it is possible to replace the convolution operation of the weight P1 by the DNN first layer processing unit 51-1 in the recognition processing unit 34 with optical processing using the mask pattern of the mask 31.

As a result, it is possible to simplify an apparatus configuration of the recognition processing unit 34, and to reduce a processing load of the image processing apparatus 101 as a whole with the simplification of the apparatus configuration.

The image reconstructed by the reconstruction unit 33 is the image P1*X' obtained by convoluting the final image (the restored image) X' corresponding to the input image X with the weight P1, and the image is difficult for humans to visually recognize content thereof, but the image can be an image including information that is essential for recognition processing. Even when the mask pattern A is stolen together with the final image and the corresponding restoration matrix G is specified, the reconstructed image includes information essential for recognition processing, but the reconstructed image is not an image that can be visually recognized as a scene by the humans, but in other words, is two-dimensional information including only the information essential for recognition processing.

As a result, it is possible to protect privacy for the reconstructed image, and even when the reconstructed image is stolen, the image cannot be visually recognized, and thus, special management preventing the image from being exposed to a third party is not necessary.

2. First Embodiment

Next, a configuration example of a first embodiment of the image processing apparatus of the present disclosure will be described with reference to the block diagram of FIG. 3.

Figure 3:
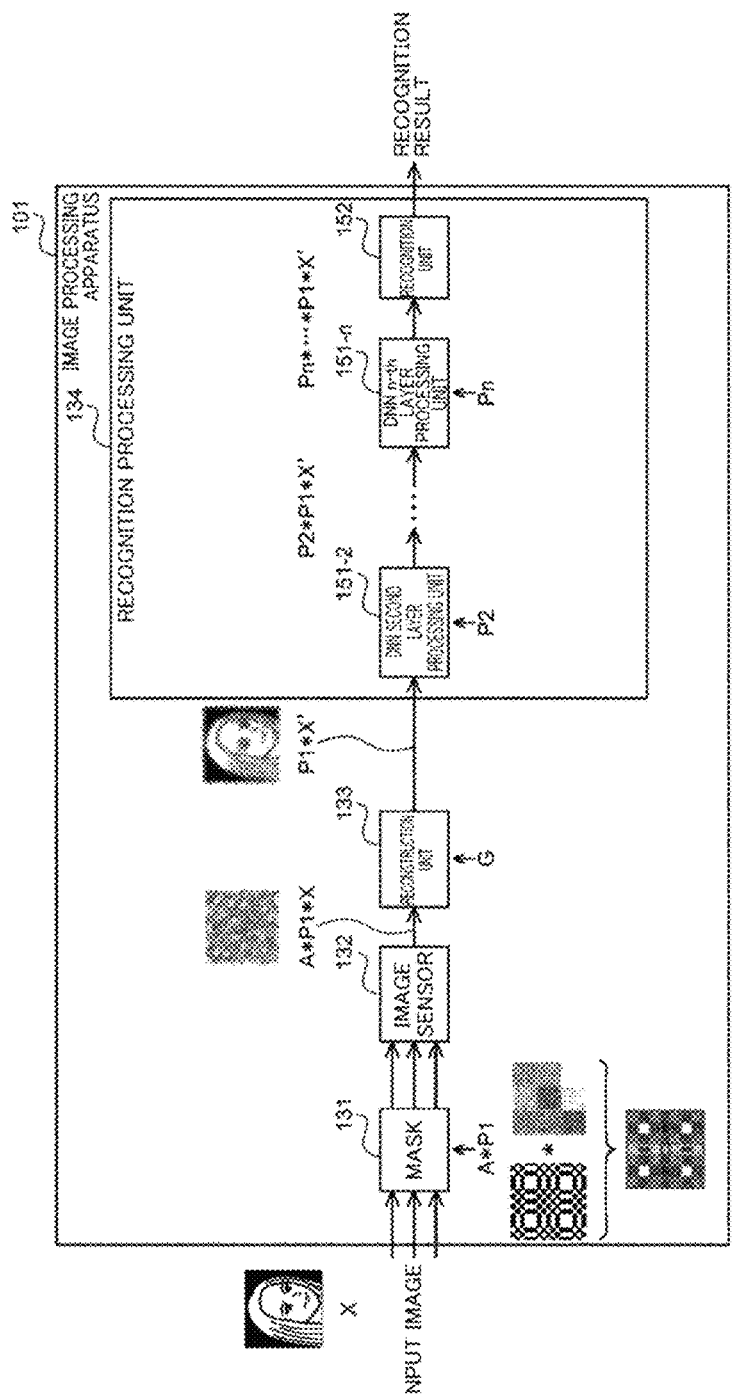
FIG. 3 is a diagram illustrating an image processing apparatus that realizes image recognition processing using lensless imaging of the present disclosure.

The image processing apparatus 101 in FIG. 3 includes a mask 131, an image sensor 132, a reconstruction unit 133, and a recognition processing unit 134.

The image sensor 132 and the reconstruction unit 133 have the same configurations as the image sensor 32 and the reconstruction unit 33 in FIG. 1, respectively.

A basic function of the mask 131 is the same as that of the mask 31 in FIG. 1, but a mask pattern is obtained by convoluting the mask pattern A in FIG. 1 with the weight P1 that is used in the convolution operation of the DNN first layer processing unit 51-1 in FIG. 1. Hereinafter, the mask pattern of the mask 131 is expressed as a mask pattern A*P1.

The recognition processing unit 134 has the same basic function as the recognition processing unit 34 in FIG. 1, but a configuration corresponding to the DNN first layer processing unit 51-1 in FIG. 1 that realizes the DNN first layer processing is not provided.

That is, the recognition processing unit 134 includes a DNN second layer processing unit 151-2 to a DNN n-th layer processing unit 151-*n*, and a recognition unit 152. Functions of the DNN second layer processing units 151-2 to the DNN n-th layer processing units 151-*n* and the recognition unit 152 are the same as those of the DNN second layer processing unit 51-2 to the DNN n-th layer processing unit 51-*n* and recognition unit 52 in FIG. 1.

With such a configuration, the input image X is modulated by the mask 131, and a captured image captured by the image sensor 132 is expressed as A*P1*X.

As a result, the reconstruction unit 133 multiplies a captured image A*P1*X by the restoration matrix G, and outputs the image as shown in Equation (6) below to the recognition processing unit 134 as a reconstructed image.

[Math. 6]

$$\text{Reconstructed image} = G*A*P*X = P1*G*A*X \approx P1*X'  \quad (6)$$

That is, for the final image (the restored image) reconstructed in the reconstruction unit 133 expressed by Equation (6), the image P1*X' obtained by convoluting the final image (the restored image) X' corresponding to the input image X, which is the processing result in the DNN first layer processing unit 51-1, with the weight P1 is reconstructed as the final image (the restored image).

Accordingly, in the image processing apparatus 101 of FIG. 3, the convolution operation of the weight P1 by the DNN first layer processing unit 51-1 in the recognition processing unit 34 of FIG. 1 is replaced with the optical processing using the mask pattern of the mask 131.

As a result, it is possible to simplify an apparatus configuration of the recognition processing unit 134, and to reduce the processing load with the simplification of the apparatus configuration.

Further, the image reconstructed by the reconstruction unit 133 becomes the image P1*X' obtained by convoluting the final image X' corresponding to the input image X with the weight P1, and the information necessary for recognition processing is recorded as a captured image by the image sensor 132.

As a result, it is possible to protect privacy, and even when the final image is stolen, the image cannot be visually recognized, and thus, special management for protecting privacy such as managing the image not to be exposed to a third party is not necessary.

<Plurality of Channels>

Incidentally, in the image processing apparatus 101 that realizes the recognition processing described above, generally, processing of the first layer among processing of a DNN multilayer hierarchy is processed in parallel by a plurality of channels, and subsequent object recognition is generally on the basis of a plurality of feature vectors obtained in the respective channels.

Figure 4:
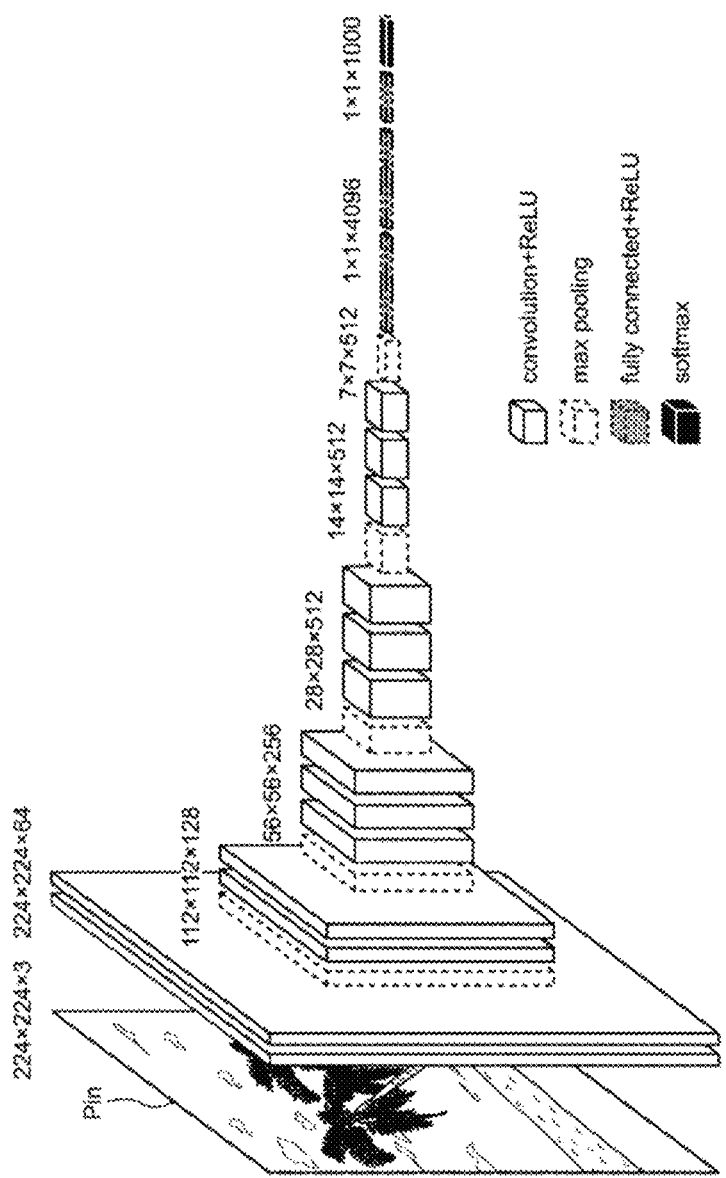
FIG. 4 is a diagram illustrating that in image recognition processing according to VGG16, processing for obtaining feature vectors is performed in parallel for a plurality of channels.

More specifically, for example, when the object recognition processing using VGG16 used for an image recognition task is realized, as illustrated in FIG. 4, the DNN first layer processing is performed by a plurality of channels.

As illustrated in FIG. 4, when an image of three channels of RGB with 224×224 resolution is an input image Pin, a 64-channel convolution result is output through the processing of the first layer (224×224×64) (convolutional ReLU (Rectified Linear Unit)).

The layer is reduced to 112×112 resolution by Maxpooling using this result, followed by 128-channel convolution for 112×112 resolution (112×112×128).

Subsequently, the layer is reduced to 56×56 resolution by Maxpooling using this result, followed by 256-channel convolution for 56×56 resolution (56×56×256).

Further, the layer is reduced to 28×28 resolution by Maxpooling using this result, followed by 512-channel convolution for 28×28 resolution (28×28×512).

Further, the layer is reduced to 14×14 resolution by Maxpooling using this result, followed by 512-channel convolution for 14×14 resolution (14×14×512).

Further, the layer is reduced to 7×7 resolution by Maxpooling using this result, and 512-channel convolution is performed for 7×7 resolution (7×7×512).

Thereafter, a determination result (fully connected+ReLU) (1×1×4096) of the feature vector is generated on the basis of a result of the 512-channel convolution (7×7×512) with this 7×7 resolution.

A probability function (softmax) based on the feature vector determination result (fully connected+ReLU) (1×1×4096) is output as the recognition result.

<Multi-Channel Image Recognition Apparatus>

Therefore, the image recognition apparatus of the present disclosure also requires a configuration with a plurality of channels according to the number of channels in the first layer.

That is, the image processing apparatus corresponding to a plurality of channels according to the present disclosure has a configuration such as that shown as an image processing apparatus 111 in FIG. 5, which is obtained by causing the image processing apparatus 101 described with reference to FIG. 3 to support the plurality of channels.

Figure 5:
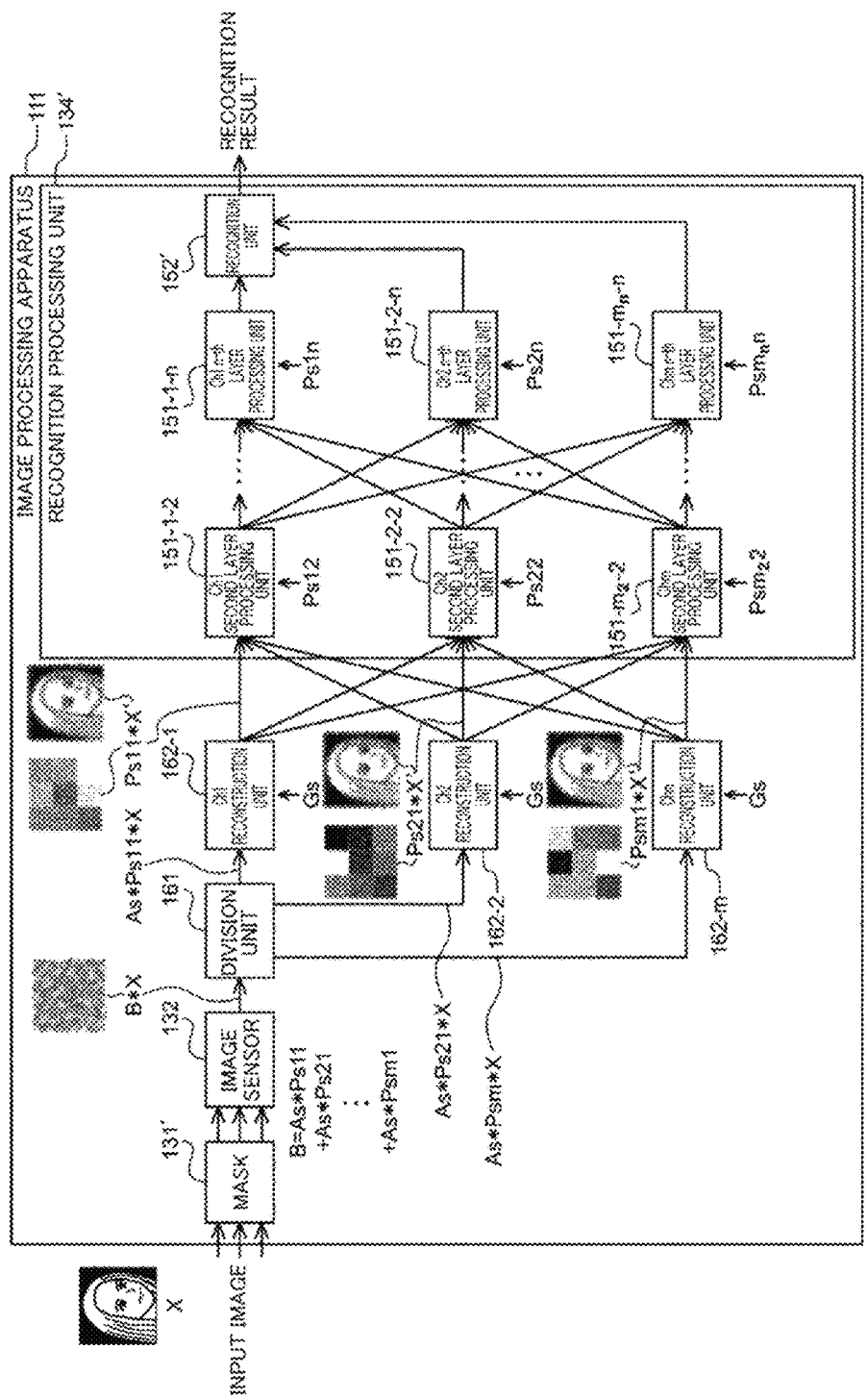
FIG. 5 is a diagram illustrating a configuration example of a first embodiment of the image processing apparatus that realizes image recognition processing using lensless imaging of the present disclosure.

The image processing apparatus 111 of FIG. 5 includes a mask 131', an image sensor 132, a division unit 161, a Ch1 reconstruction units 162-1 to a Chin reconstruction unit 162-$m$, and a recognition processing unit 134'. In the following description, it is assumed that the number of channels in the first layer is m.

The mask 131' has the same basic function as the mask 131, but has a mask pattern B divided into as many sub-areas as the number of channels.

Figure 6:
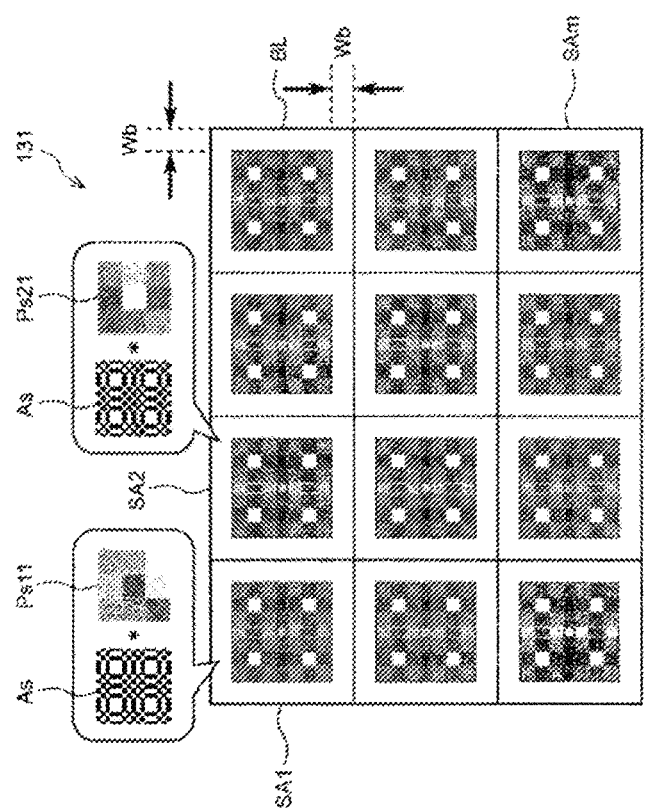
FIG. 6 is a diagram illustrating an example of a mask pattern that is set for each sub-area.

That is, the mask 131' is divided into sub-areas SA1 to SAm corresponding to the number of channels=m, as illustrated in FIG. 6, for example.

The mask pattern B covering the whole of the respective sub-areas SA1 to SAm is a mask pattern B (=As*Ps11+ As*Ps21+ . . . As*Psm1) in which each mask pattern As, which is the basic pattern in each sub-area of channels 1 to m, is convoluted with a weight Psm1 used for convolution operation in the DNN first layer processing unit 51-1 of FIG. 1.

'+' in As*Ps11+As*Ps21+ . . . , As*Psm1 expressing the mask pattern B means disposition at another position in a two-dimensional plane consisting of an incidence surface for the incident light in the mask 131', and does not intend overlapping in the incidence direction of the incident light.

The mask pattern As of each sub-area, which is the basic pattern, is a mask pattern used in a so-called lensless camera, such as the MURA pattern or an M-series, and is a binary pattern.

That is, in FIG. 6, as an example, it is shown that a mask pattern of the sub-area SA1 is configured of As*Ps11, and a mask pattern of the sub-area SA2 is configured of As*Ps21.

<Interval Between Adjacent Sub-Areas (when Margin Area is Provided)>

Further, between the sub-areas, a margin area BL configured of a light-shielding area indicated by a white area in FIG. 6 is formed in order to suppress image interference between adjacent areas.

Figure 7:
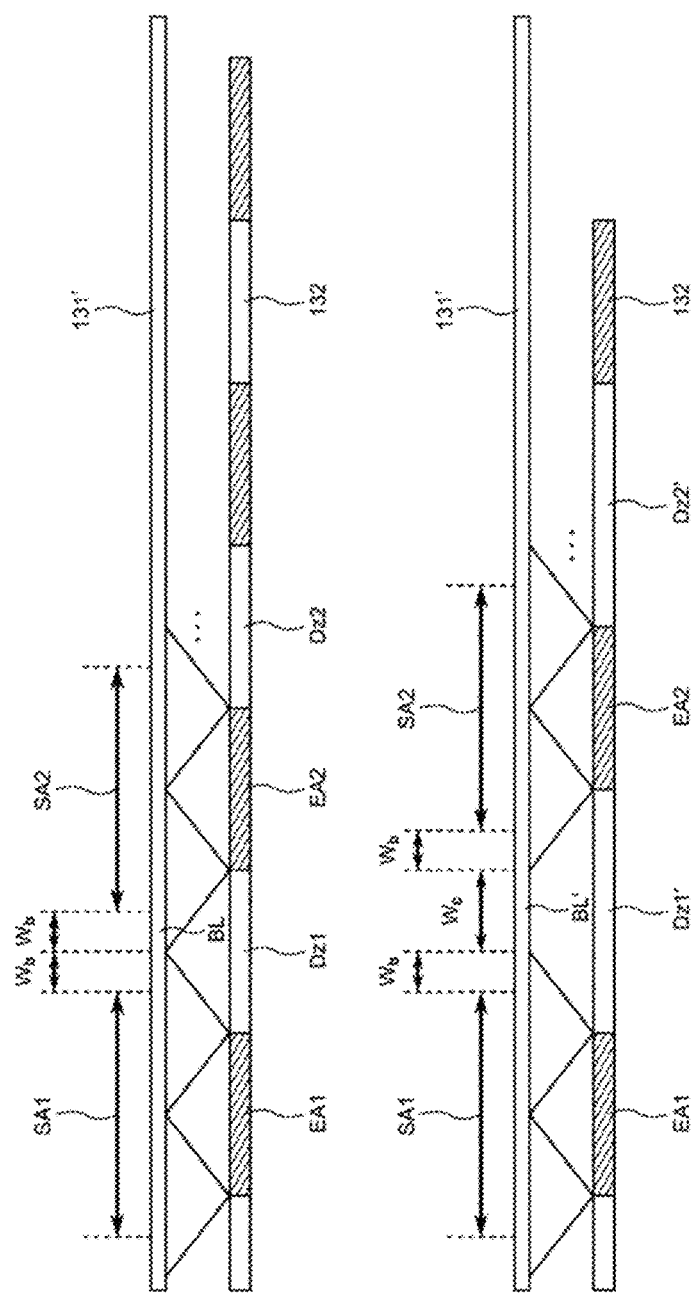
FIG. 7 is a diagram illustrating that a margin area is set between adjacent sub-areas.

FIG. 7 is a side cross-sectional view of the mask 131' and the image sensor 132 viewed in a direction perpendicular to an incidence direction of incident light. In FIG. 7, a downward direction in the drawing is an incidence direction of the incident light, and a range of width 2×wb between the sub-areas SA1 and SA2 on the mask 131' is the margin area BL.

As illustrated in an upper part of FIG. 7, since there is a viewing angle for each pixel on the imaging surface of the image sensor 132, an effective area on the image sensor 132 capable of capturing a captured image with respect to the sub-area SA1 of the mask 131' is an effective area EA1, and an effective area on the image sensor 132 capable of capturing a captured image with respect to the sub-area SA2 is an effective area EA2.

Therefore, an area Dz1 between the effective areas EA1 and EA2 becomes a dead zone in which imaging is impossible.

Figure 8:
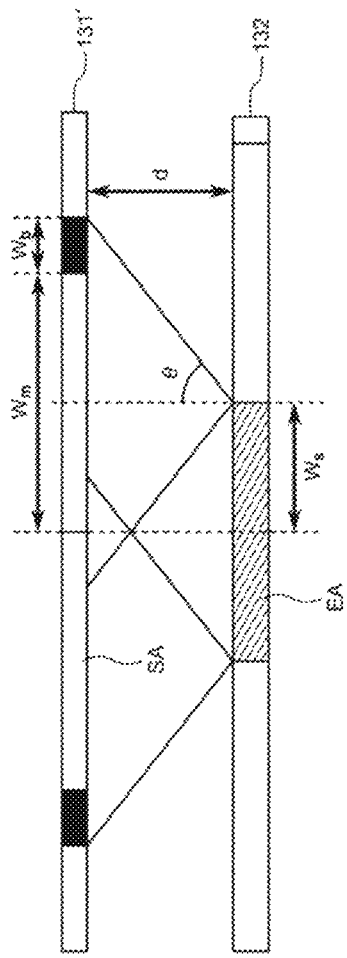
FIG. 8 is a diagram illustrating how to obtain a width of the margin area between adjacent sub-areas.

The width wb of the margin area BL becomes, for example, a size required to prevent the mask pattern of the adjacent sub-area from entering the range when a field of view (FOV) of each pixel of the image sensor 132 is set to 2 θ, as illustrated in FIG. 8.

In a general lensless camera, a mask size (a distance from a center of a square sub-area to an edge of the sub-area in the mask 131') wm and a sensor size (a distance from a center of an effective area of a square sub-area to an edge of the effective area in the image sensor 132) ws are wm>ws.

Therefore, a relationship between an FOV of a pixel on the edge of the effective area of the image sensor 132 and the sub-area of the mask 131' may be considered as illustrated in FIG. 8, and a minimum required size wb of the margin area is expressed by Equation (7) below.

[Math. 7]

$$w_b = d \times \tan\theta(w_m - w_s) \quad (7)$$

Although an example in which the range of the width 2×wb as the light shielding area between the sub-areas on the mask 131' is set as the margin area has been described above, the margin area needs only to be wider than the width 2×wb, and thus, a margin area BL' further including a width we may be set between the widths wb, as illustrated in a lower part of FIG. 7. In this case, a dead zone in which imaging is impossible consisting of an area Dz1' wider than the area Dz1 in the upper part of FIG. 7 is set between the effective areas EA1 and EA2. Further, a light shielding wall may be formed in a direction perpendicular to the incidence direction of the incident light at an edge portion of each sub-area to suppress interference between the adjacent sub-areas. This makes it possible to reduce the margin area and widen the effective area of the image sensor 132.

<Interval Between Adjacent Sub-Areas (when Construction is Made by Overlapping)>

Further, an example in which the margin area BL is provided between the sub-areas described with reference to FIGS. 6 to 8 has been described, but when such a configuration is adopted, a dead zone is generated on the image sensor 132, which reduces an amount of information of the input image X and, as a result, reduces an S/N.

Therefore, the mask pattern As that is the basic pattern used to generate the mask pattern for each sub-area may be devised so that an influence of interference between adjacent sub-areas is reduced and channel separation through signal processing is easily performed.

For example, the mask pattern As that is a basic pattern for each channel, that is, for each sub-area is created by using a pseudo-random signal with a low correlation obtained from an M-series or gold code, and thus, a correlation with the basic pattern for each channel is reduced even when signals from adjacent sub-areas are mixed with an observed value, making it possible to minimize an influence of interference between the adjacent sub-areas. Ideally, a correlation between the adjacent sub-areas for the basic pattern for each channel is a non-correlation, but the correlation is minimized by a pseudo-random signal.

When this principle is applied, sub-areas may be set on the mask 131' so that the dead zone is not generated on the image sensor 132 described with reference to FIG. 7, and in this case, the sub-areas may be in complete contact with each other.

Figure 9:
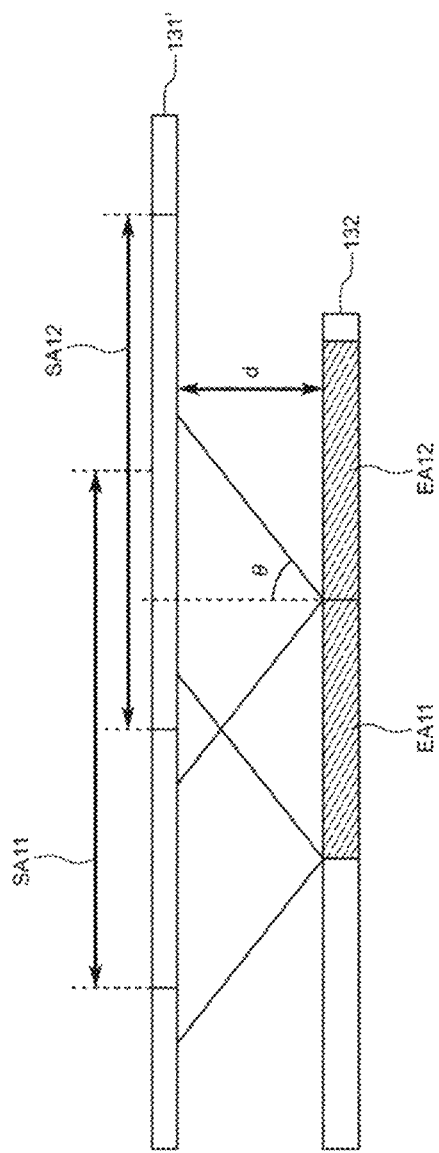
FIG. 9 is a diagram illustrating an example of a mask pattern when adjacent sub-areas overlap.

Further, since the correlation between the mask patterns As, which are the basic patterns for the respective sub-areas, is low, it is possible for the mask patterns of the adjacent sub-areas to be disposed to overlap, as illustrated in FIG. 9, unless the effective areas on the image sensor 132 overlap.

In FIG. 9, the effective areas EA1 and EA2 in which images of adjacent sub-areas are captured are set on the image sensor 132, the effective areas EA1 and EA2 overlap corresponding sub-areas SA11 and SA12 on the mask 131'.

Even with such a configuration, when a correlation between respective basic mask patterns in the sub-areas SA11 and SA12 is low, and, for example, are orthogonal to each other, images captured in the effective areas EA1 and EA2 on the image sensor 132 do not interfere with each other.

With such a configuration, since no dead zone is set on the image sensor 132, it is possible to suppress reduction in an amount of information of the input image X and improve an S/N.

Now, the description of FIG. 5 is referred back to. The image sensor 132 captures a captured image B*X for the input image X on the basis of the incident light modulated by the mask 131' configured of the mask pattern B, and outputs the captured image B*X to the division unit 161.

The division unit 161 divides the captured image B*X for each of the sub-areas SA1 to SAm, and outputs the divided image to the Ch1 reconstruction units 162-1 to the Chin reconstruction units 162-m of the corresponding channels.

That is, the division unit 161 outputs a captured image As*Ps11*X of the sub-area SA1 corresponding to channel 1 in the captured image B*X to the Ch1 reconstruction unit 162-1, and outputs a captured image As*Ps21*X of the sub-area SA2 corresponding to the channel 2 in the captured image B*X to the Ch2 reconstruction unit 162-2, . . . , and outputs a captured image As*Psm1*X of the sub-area SAm corresponding to the channel m in the captured image B*X to the Chin reconstruction unit 162-m.

The Ch1 reconstruction units 162-1 to the Chin reconstruction units 162-m multiply the captured images As*Ps11*X to As*Psm1*X of the sub-areas SA1 to SAm of the respective channels by the restoration matrix Gs corresponding to the mask pattern As of a low-resolution image corresponding to the sub-areas to reconstruct the image, and output resultant images to the recognition processing unit 134' for the respective channels.

That is, the Ch1 reconstruction unit 162-1 of channel 1 multiplies the captured image As*Ps11*X of the sub-area SA1 by the restoration matrix Gs corresponding to the mask pattern As to restore an image Ps11*X' processed by the DNN first layer processing unit 52-1 in FIG. 1, and outputs the image to the Ch1 second layer processing unit 151-1-2, Ch2 second layer processing unit 151-2-2, . . . , and a Chm$_2$ second layer processing unit 151-$m_2$-2 of the recognition processing unit 134'.

Similarly, the Ch2 reconstruction unit 162-2 of channel 2 multiplies the captured image As*Ps21*X of the sub-area SA2 by the restoration matrix Gs corresponding to the mask pattern As to restore an image Ps21*X' processed by the DNN first layer processing unit 52-1 in FIG. 1, and outputs the image to the Ch1 second layer processing unit 151-1-2, Ch2 second layer processing unit 151-2-2, . . . , and the Chm$_2$ second layer processing unit 151-$m_2$-2 of the recognition processing unit 134'.

Further, the Chin reconstruction unit 162-m of channel m multiplies the captured image As*Psm1*X of the sub-area SAm by the restoration matrix Gs corresponding to the mask pattern As to restore an image Psm1*X' processed by the DNN first layer processing unit 52-1 in FIG. 1, and outputs the image to the Ch1 second layer processing unit 151-1-2, Ch2 second layer processing unit 151-2-2, . . . , and the Chm$_2$ second layer processing unit 151-$m_2$-2 of the recognition processing unit 134'.

The recognition processing unit 134' includes a Ch1 second layer processing unit 151-1-2 to the Chm$_2$ second layer processing unit 151-$m_2$-2, a Ch1 third layer processing unit 151-1-3 to a Chm$_3$ third layer processing unit 151-$m_3$-3, . . . , a Ch1 n-th layer processing unit 151-1-n to a Chm$_n$ n-th layer processing unit 151-$m_n$-n.

That is, the recognition processing unit 134' has a configuration corresponding to the DNN second layer processing units 151-2 to the DNN n-th layer processing units 151-n in the recognition processing unit 134 in FIG. 3 for a plurality of channels.

More specifically, the Ch1 second layer processing unit 151-1-2 to the Chm$_2$ second layer processing unit 151-$m_2$-2, the Ch1 third layer processing unit 151-1-3 to the Chm$_3$ third layer processing unit 151-$m_3$-3, . . . , and the Ch1 n-th layer processing unit 151-1-n to the Chm$_n$ n-th layer processing unit 151-$m_n$-n sequentially convolute the reconstructed image Ps11*X' of channel 1, the reconstructed image Ps21*X' of channel 2, . . . , and the reconstructed image Psm1*X' of channel m with the weight to calculate feature vectors, and output feature vectors to the recognition unit 152'.

The recognition unit 152' recognizes the object in the subject of the input image X, on the basis of feature vectors that are convolution operation results supplied from the Ch1 n-th layer processing unit 151-1-n to the Chm$_n$ n-th layer processing unit 151-$m_n$-n, which are in a final stage of the recognition processing unit 134'.

That is, the Ch1 reconstruction units 162-1 to the Chin reconstruction units 162-m multiply the captured images As*Ps11*X to As*Psm1*X of the sub-areas SA1 to SAm of the respective channels by the restoration matrix Gs corresponding to the mask pattern As, and outputs a processing result of the DNN first layer processing unit 52-1 in FIG. 1 in the respective channels, that is, images Ps11*X' to Psm1*X' that are the processing result of the DNN first layer to the recognition processing unit 134'.

Therefore, the reconstructed images Ps11*X' to Psm1*X' are output as a processing result of performing the DNN first layer processing in the respective channels on a low-resolution restored image obtained by dividing the image sensor 132 into sub-areas for the respective channels.

Therefore, the restored image reconstructed by each channel includes the information necessary for recognition processing, but since the restored image is output to the recognition processing unit 134' in a state in which the restored image becomes an image difficult for the human to visually recognize as the scene or object, the restored image is protected for privacy. Further, since the restored image is protected for privacy, the restored image does not require special management that takes privacy into consideration.

Further, since the DNN first layer processing in each channel is switched to the optical processing in the mask 131', the configuration corresponding to the DNN first layer processing unit 52-1 in FIG. 1 for each channel becomes unnecessary, making it possible to simplify the apparatus configuration.

Further, since the configuration corresponding to the DNN first layer processing unit 52-1 becomes unnecessary, it is possible to reduce the processing load in the image processing apparatus 111.

<Recognition Processing in Image Processing Apparatus of FIG. 5>

Figure 10:
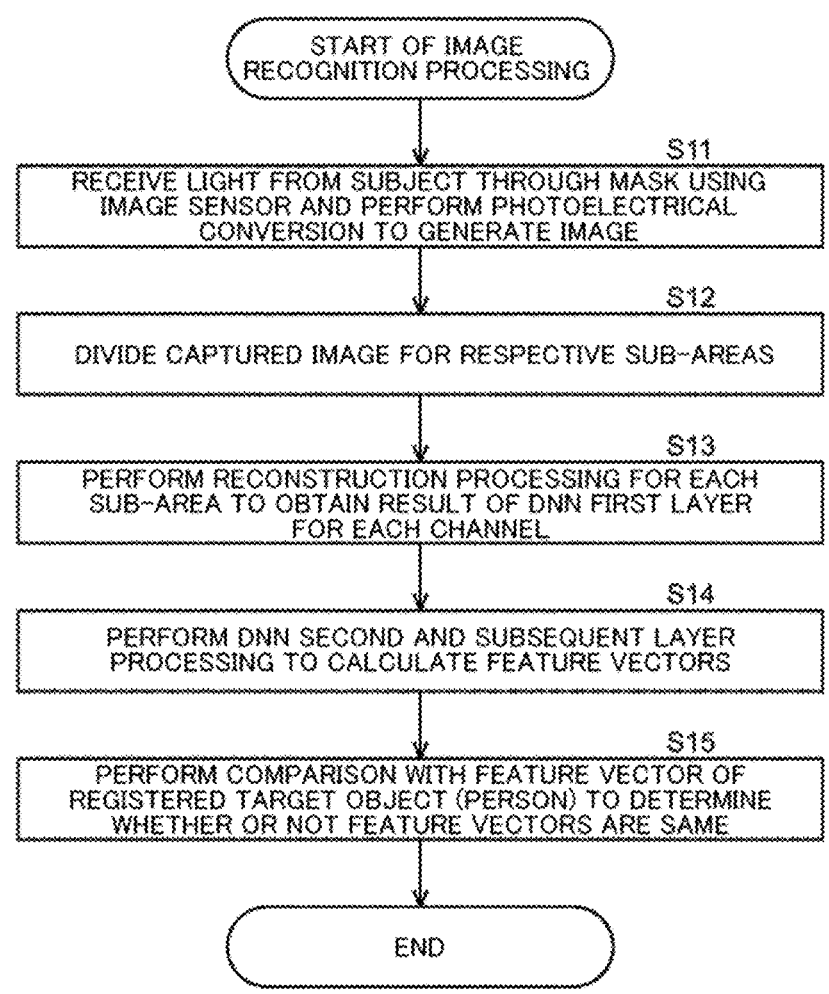
FIG. 10 is a flowchart illustrating the recognition processing in the image processing apparatus of FIG. 5.

Next, the image recognition processing in the image processing apparatus 111 in FIG. 5 will be described with reference to the flowchart in FIG. 10.

In step S11, the image sensor 132 photoelectrically converts the input image X, which is light from the subject modulated by the mask 131' of the mask pattern B in which the mask pattern As, which is the basic pattern for each sub-area, is convoluted with a weight related to the DNN first layer processing for each channel, to generate a captured image B*X, and outputs the captured image B*X to the division unit 161.

In step S12, the division unit 161 divides the captured image B*X into restored images As*Ps11*X to As*Psm1*X for the respective sub-areas corresponding to the respective channels, and outputs the resultant images to the Ch1 reconstruction unit 162-1 to the Chn reconstruction unit 162-$m$ of the corresponding channels.

In step S13, the Ch1 reconstruction units 162-1 to the Chn reconstruction units 162-$m$ multiply the images As*Ps11*X to As*Psm1*X by the restoration matrix Gs for the respective channels to obtain restored images consisting of the processing result of the DNN first layer, and outputs the restored images to the Ch1 second layer processing unit 151-1-2 to the Ch$m_2$ second layer processing unit 151-$m_2$-2 of the recognition processing unit 134'.

In step S14, the Ch1 second layer processing unit 151-1-2 to the Ch$m_2$ second layer processing unit 151-$m_2$-2, the Ch1 third layer processing unit 151-1-3 to the Ch$m_3$ third layer processing unit 151-$m_3$-3, . . . , and the Ch1 n-th layer processing unit 151-1-$n$ to the Ch$m_n$ n-th layer processing unit 151-$m_n$-n in the recognition processing unit 134' execute DNN second and subsequent layer processing for the respective channels to obtain the feature vectors, and output the feature vectors to the recognition unit 152'.

In step S15, a recognition unit 152' executes target object recognition processing on the basis of whether or not the information of the feature vector of each channel matches the feature vector of the target object, and outputs a recognition result.

Through the above processing, the restored image reconstructed by each channel is output to the recognition processing unit 134' in a state in which the restored image becomes an image difficult for the human to visually recognize as the object by the configuration functioning as a lensless camera. As a result, it is possible to protect the privacy of the restored image, and special management that takes privacy protection into consideration is not necessary when the restored image is managed.

Further, since the DNN first layer processing in FIG. 1 in each channel is switched to the optical processing in the mask 131', a configuration for realizing the DNN first layer processing in FIG. 1 for each channel becomes unnecessary, making it possible to simplify the apparatus configuration.

Further, it is possible to reduce a processing load in the image processing apparatus 111 by eliminating the DNN first layer processing.

An example in which the division unit 161 divides the image captured by the image sensor 132 for respective channels by using the mask pattern in which the mask 131' is provided with a sub-area for each channel and convoluted with the weight related to the DNN first layer processing, and outputs the resultant image to the Ch1 reconstruction unit 162-1 to the Chn reconstruction unit 162-$m$ of the respective channels has been described above.

However, the Ch1 reconstruction units 162-1 to the Chn reconstruction units 162-$m$ of the respective channels may be configured to extract and process sub-area information necessary for processing of their own channels from the captured image B*X, so that the division unit 161 is omitted.

(Learning of Mask Pattern)

When the mask pattern for ensuring privacy protection is generated, the mask pattern is generated through learning in which two types of different indices are simultaneously satisfied at the time of training of a recognition processing network.

Here, it is assumed that the mask pattern is generated from the weight used in the DNN first layer processing, and only a weight of the DNN first layer is common for a target of optimization using two different indices.

A first index is an index in which a degree of deviation of an ID classification that directly defines performance of recognition processing or a recognition result from correct answer data is set as a loss function. Networks of the first layer and the second and subsequent layers of recognition processing are optimized so that this loss function becomes small.

A second index is an index for ensuring privacy protection, that is, an index for ensuring that the reconstructed final image (restored image) is set as an image difficult for humans to visually recognize as a scene or an object and, to this end, a network that performs image restoration processing for restoring the modulated image generated when the original image is modulated by the mask pattern to the original image is separately learned on the premise that the mask pattern itself is known This image restoration processing network is trained so that a difference between the original image and the modulated image becomes small.

On the other hand, a difference between an image output by the image restoration processing network and the original image is evaluated by indices representing a degree of image similarity such as PSNR, MSE, SSIM, and VGG16, and the weight of the DNN first layer is learned so that a value of the evaluation becomes small, making it possible to achieve a system capable of performing recognition processing while ensuring privacy protection.

That is, in the case of a facial image or the like, the weight of the DNN first layer is obtained by learning so that a mask pattern in which modulation processing for causing only information required for recognition processing from the facial image serving as the original image to be left and minimizing information required for restoration of the facial image is performed is constructed.

The weight of the DNN first layer is reflected in the mask pattern so that the captured image captured by the input image being modulated by the mask pattern includes only information required for subsequent recognition processing. As a result, it is possible to sufficiently maintain accuracy in the recognition processing, and it is possible for the final image (the restored image) to be an image that is so different that it is difficult for human to visually recognize the input image, that is, an image whose privacy has been protected with high accuracy.

As an evaluation index for privacy protection, a recognition rate when a recognizer for a normal image is operated may be used for the restored image output by the image restoration processing network. In this case, the weight of the DNN first layer is learned so that the recognition rate is lowered, making it possible to provide a system capable of performing recognition processing while ensuring privacy protection.

3. Second Embodiment

An example in which the mask 131 is divided into sub-areas, a channel is assigned to each sub-area, a mask pattern is generated by convoluting the corresponding weight related to the corresponding DNN first layer processing, the captured image captured in the image sensor 132 is divided into sub-area units, and a processing result of the DNN first layer for each channel is obtained as a reconstructed image has been described above.

However, the mask patterns that are the basic patterns in the mask 131 have a low correlation for the respective channels, and patterns obtained by convoluting all the basic patterns with the weight convoluted in the DNN first layer processing are overlapped and used.

That is, for example, a mask pattern Ki, which is the basic pattern set for each channel, is defined as shown in Equation (8) below, so that a correlation between the basic patterns of the respective channels is the lowest.

[Math. 8]

$$Ki * Kj \approx \begin{cases} 0 & (i \neq j) \\ I & (i = j) \end{cases} \quad (8)$$

Her, I is an identity matrix. That is, the mask pattern Ki is uncorrelated and becomes an identity matrix at the time of multiplication by itself.

Using the mask pattern Ki as the basic pattern set for each channel, a mask pattern C is set as expressed by Equation (9) below.

[Math. 9]

$$C = \Sigma_i (Ki * Pi1)(i: \text{channel}) \quad (9)$$

Here, Pi1 is a weight used in a DNN first layer convolution operation for channel i.

Figure 11:
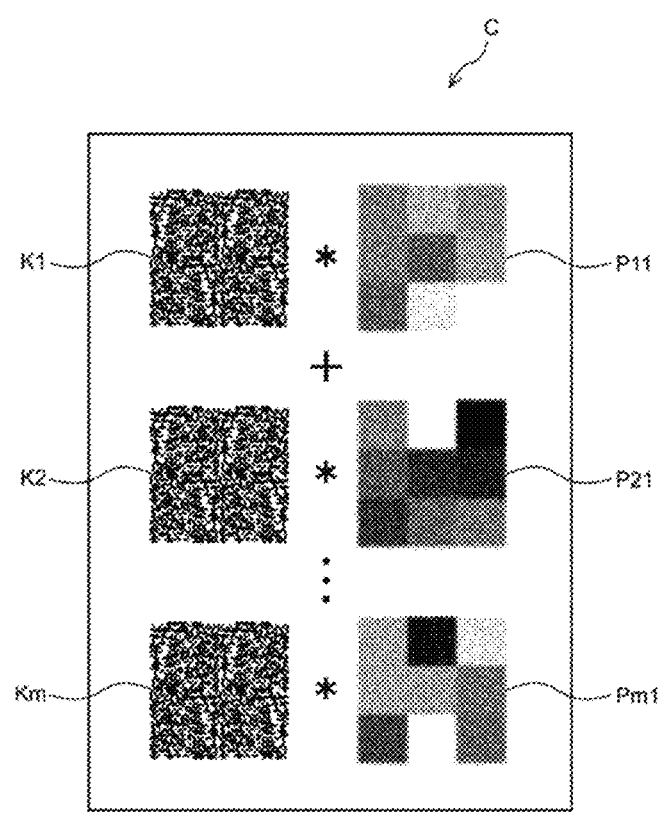
FIG. 11 is a diagram illustrating an example of a mask pattern that is formed by overlapping patterns obtained by convoluting basic patterns with a low correlation for respective channels with a weight of a DNN first layer for all channels.

That is, the mask pattern C expressed by Equation (9) can be schematically expressed as in FIG. 11.

That is, the basic pattern of each of m channels is set to Ki having a low correlation, and the mask patterns Ki*Pi1 of the respective channels convoluted with the weight Pi1 convoluted in the DNN first layer processing of each channel are overlapped for the m channels to form the mask pattern C. The "+" illustrated in FIG. 11 indicates overlapping of mask patterns.

The input image X is modulated using the mask pattern C configured in this way, and the mask pattern Ki serving as the basic pattern of each channel is used as the restoration matrix, as shown in Equation (10) below, for captured image C*X, making it possible to obtain the processing result of the DNN first layer for each channel (extract from the captured image C*X).

[Math. 10]

$$Ki * C * X = Pi1 * X' \quad (10)$$

Accordingly, in the image processing apparatus 111 of FIG. 5, when the feature vectors are extracted, recognition processing using the feature vectors obtained in units of sub-areas is performed, but it becomes possible to obtain the feature vectors using a high-resolution restored image using the entire image captured by the image sensor 132 by using, for each channel, the mask pattern C in which the respective basic patterns are convoluted with the weight Pi1 convoluted in the DNN first layer processing.

Figure 12:
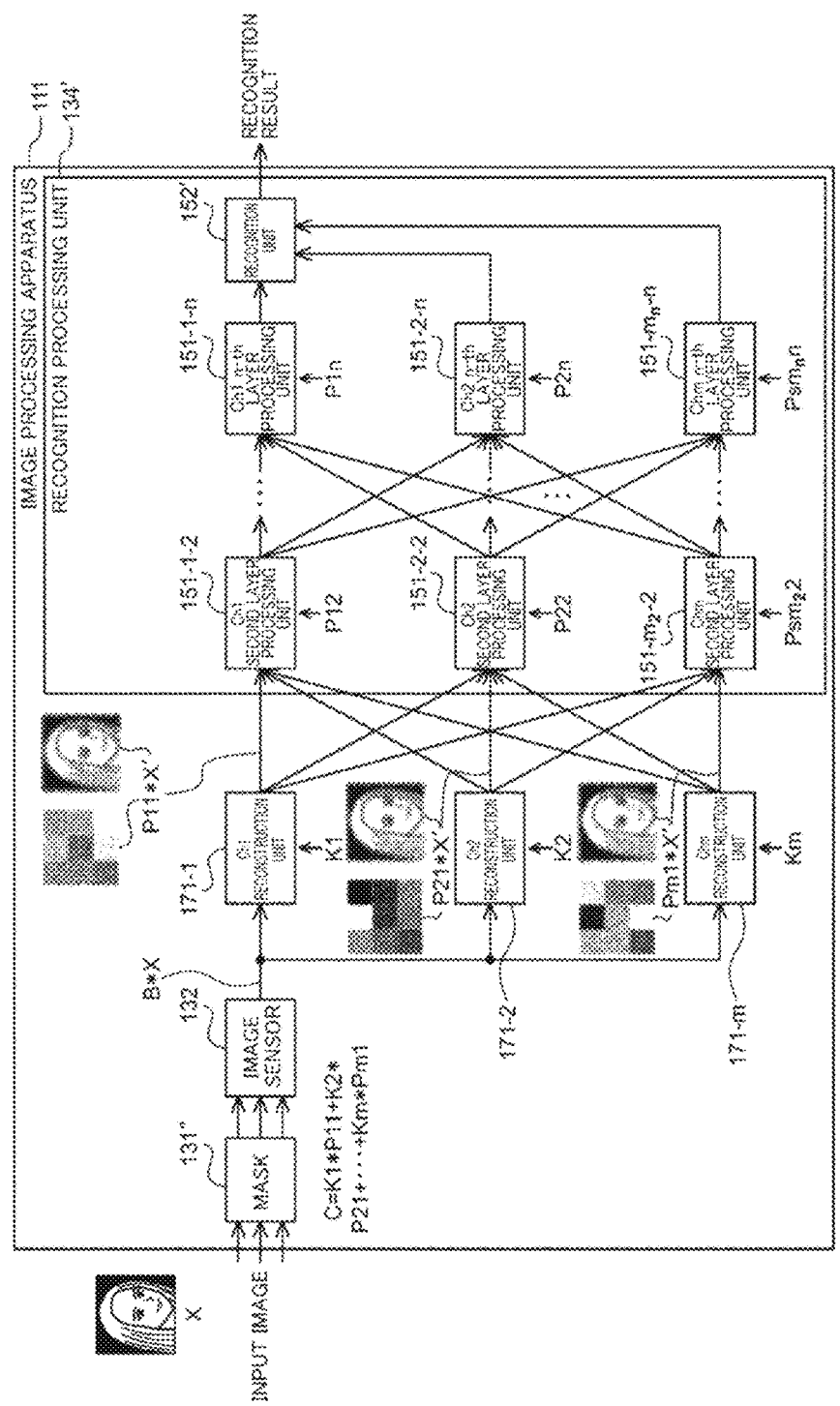
FIG. 12 is a diagram illustrating a configuration example of a second embodiment of the image processing apparatus that realizes image recognition processing using lensless imaging of the present disclosure.

FIG. 12 illustrates a configuration example of the image processing apparatus 111 that realizes the image recognition processing using a mask consisting of the mask pattern C described with reference to FIG. 11.

In the image processing apparatus 111 of FIG. 12, components having the same functions as those of the image processing apparatus 111 in FIG. 5 are denoted by the same reference signs, and description thereof will be omitted appropriately.

That is, a difference between the image processing apparatus 111 in FIG. 12 and the image processing apparatus 111 in FIG. 5 is that a mask 131", and a Ch1 reconstruction unit 171-1 to a Chin reconstruction unit 171-$m$ are provided instead of the mask 131', the division unit 161, and the Ch1 reconstruction unit 162-1 to the Chin reconstruction unit 162-$m$.

The mask 131" is configured of the mask pattern C in which a basic pattern having a low correlation and the weight Pi1 convoluted in the DNN first layer processing of each channel are convoluted for each of the channels described above.

The Ch1 reconstruction units 171-1 to the Chin reconstruction units 171-$m$ obtain the processing result obtained by multiplying the reconstructed image X' in each channel from the captured image C*X by the weight Pi1 of the DNN first layer (extracts the processing result) by using the mask pattern Ki, which is the basic pattern in the mask 131", as the restoration matrix in each channel, and output the processing result to the recognition processing unit 134' in the subsequent stage.

Each component of the recognition processing unit 134' in FIG. 12 is the same as each component of the recognition processing unit 134' in FIG. 5, but both differ from each other in that a processing target of each component of the recognition processing unit 134' in FIG. 5 is information in units of sub-area assigned to each channel, whereas a processing target of each component of the recognition processing unit 134' in FIG. 12 is information of all areas captured by the image sensor 132 in each channel.

<Recognition Processing in Image Processing Apparatus of FIG. 12>

Figure 13:
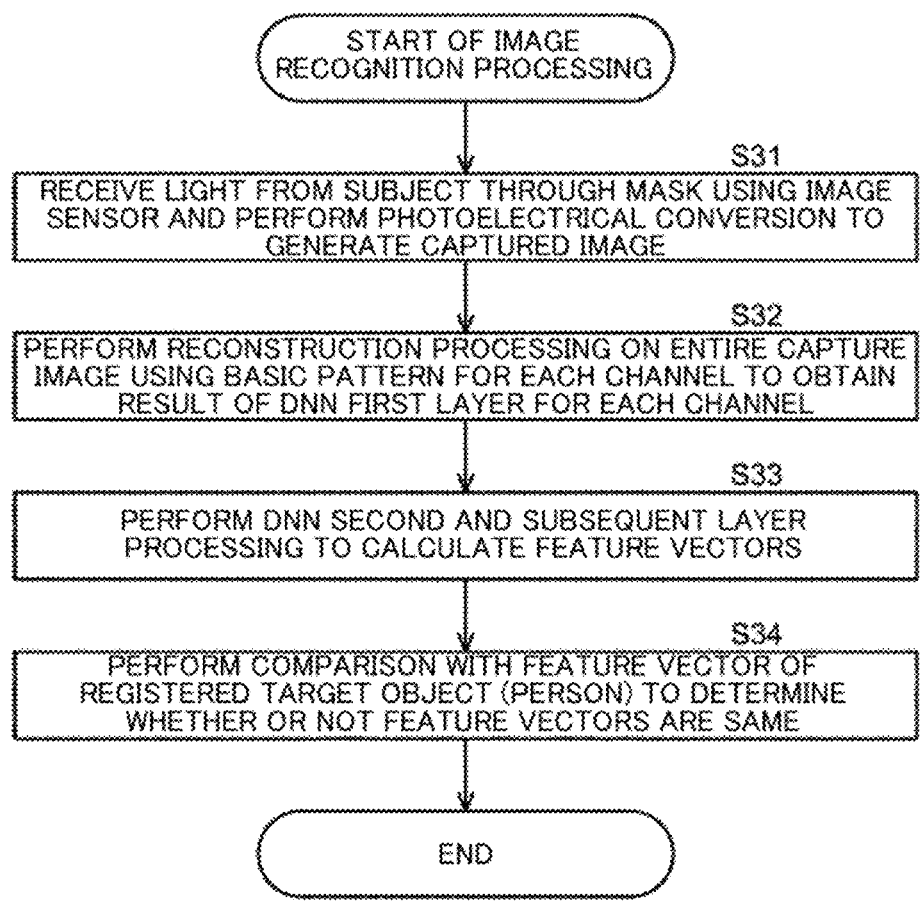
FIG. 13 is a flowchart illustrating the image recognition processing in the image processing apparatus of FIG. 12.

Next, recognition processing in the image processing apparatus 111 in FIG. 12 will be described with reference to a flowchart in FIG. 13.

In step S31, the image sensor 132 photoelectrically converts the input image X that is the light from the subject modulated by the mask 131" of the mask pattern C in which the mask patterns in which the mask pattern Ki, which is the basic pattern for each channel, and the weight Pi1 related to the DNN first layer processing are convoluted are overlapped, to generate the captured image C*X, and outputs the captured image C*X to the Ch1 reconstruction unit 171-1 to Chin reconstruction unit 171-$m$.

In step S32, the Ch1 reconstruction unit 171-1 to the Chin reconstruction unit 171-$m$ multiply the captured image C*X by the mask pattern Ki, which is the basic pattern of the respective channels, to obtain restored images consisting of the DNN first layer processing result in the respective channels, and output the restored images to the Ch1 second layer processing unit 151-1-2 to the Chm$_2$ second layer processing unit 151-$m_2$-2.

In step S33, the Ch1 second layer processing unit 151-1-2 to the Chm$_2$ second layer processing unit 151-$m_2$-2, the Ch1 third layer processing unit 151-1-3 to the Chm$_3$ third layer processing unit 151-$m_3$-3, . . . , the Ch1 n-th layer processing unit 151-1-$n$ to the Chm$_n$ n-th layer processing unit 151-$m_n$-n execute DNN second and subsequent layer processing for the respective channels to obtain the feature vectors, and output the feature vectors to the recognition unit 152'.

In step S34, the recognition unit 152' executes target object recognition processing on the basis of whether or not the information of the feature vector of each channel matches the feature vector of the target object, and outputs a recognition result.

Through the above processing, since the restored image reconstructed in each channel is output to the recognition processing unit 134' in a state in which the restored image becomes an image in which difficult for human to visually recognize the object, it is possible to realize privacy protection, and special management of the restored image taking privacy into consideration is not necessary.

Further, since the processing in the DNN first layer processing unit 52-1 in FIG. 1 in each channel is switched to optical processing in the mask 131", the DNN first layer processing for each channel becomes unnecessary, and thus, it becomes possible to simplify the apparatus configuration.

Further, it is possible to reduce the processing load in the image processing apparatus 111 by the DNN first layer processing being unnecessary.

Further, since it is possible to obtain the feature vector of each channel using the entire image captured by the image sensor 132, it becomes possible to obtain the feature vector of each channel with higher precision as compared to a case in which the feature vector in units of sub-areas is obtained.

4. First Application Example

As a method of performing different convolutions of a plurality of channels in parallel, division into sub-areas and overlapping of basic patterns with a low correlation may be combined.

Figure 14:
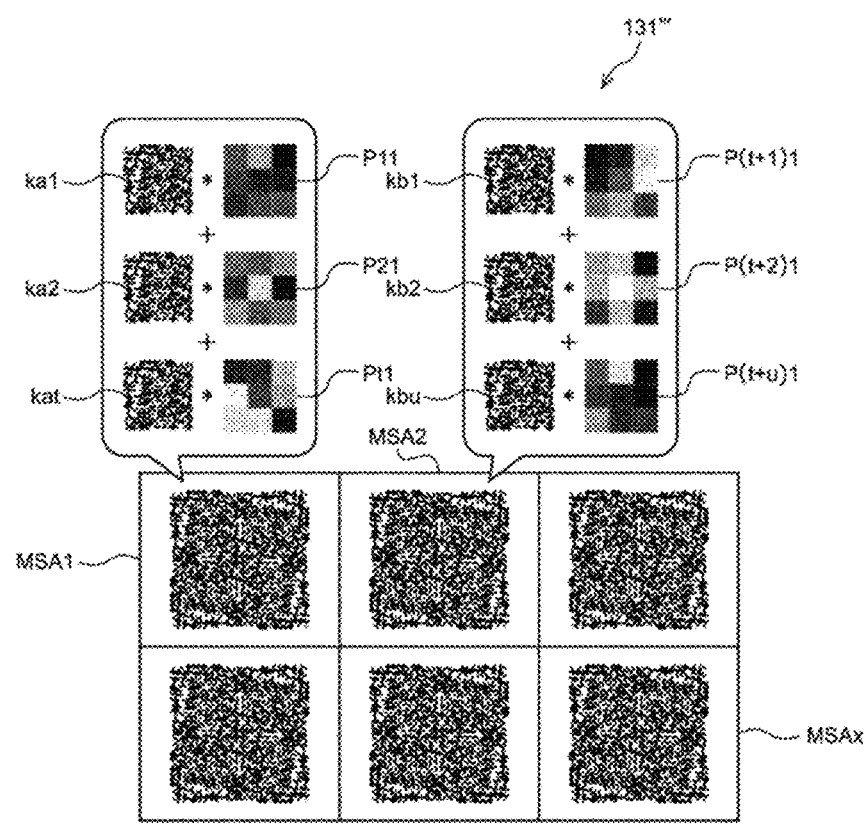
FIG. 14 is a diagram illustrating a first application example of the mask pattern.

For example, as illustrated in FIG. 14, when a mask 131''' is provided, the entire mask 131''' divided into a plurality of sub-areas MSA1 to MSAx with the basic patterns with a low correlation overlapped in the sub-areas MSA1 to MSAx is used.

In FIG. 14, the mask is divided into the sub-areas MSA1 to MSAx, and in the sub-area MSA1 among these, a mask pattern is formed in which a mask pattern obtained by convoluting a basic pattern Ka1 in channel 1 (Ch1) with the weight P11 that is used in the DNN first layer processing, a mask pattern obtained by convoluting a basic pattern Ka2 in channel 2 (Ch2) with the weight P21 that is used in the DNN first layer processing, . . . , a mask pattern obtained by convoluting a basic pattern Kat in channel t (Cht) with the weight Pt1 that is used in the DNN first layer processing are overlapped. Here, the basic patterns Ka1 to Kat have a low correlation.

Further, in sub-area MSA2, a mask pattern is formed in which a mask pattern obtained by convoluting a basic pattern Kb1 in channel (t+1) (Ch(t+1)) with a weight P(t+1)1 that is used in the DNN first layer processing, a mask pattern obtained by convoluting a basic pattern Kb2 in channel (t+2) (Ch(t+2)) with a weight P(t+2)1 that is used in the DNN first layer processing, . . . , a mask pattern obtained by convoluting a basic pattern Kbu in channel (t+u) (Ch(t+u)) with a weight P(t+u)1 that is used in the DNN first layer processing are overlapped. Here, the basic patterns Kb1 to Kbu have a low correlation.

With such a mask pattern, it is possible to balance between a trade-off relationship between the resolution of each channel and the number of channels in the division into the sub-areas, and a trade-off relationship between the number of channels and an S/N ratio of a signal extracted by signal processing in the overlapping of the basic patterns with a low correlation.

A configuration of the image processing apparatus 111 when such a mask pattern is used becomes a combination of a configuration corresponding to the division unit 161 required when the mask using the sub-areas described above is used, and a configuration corresponding to the reconstruction unit for each channel that extracts the processing result of the DNN first layer of each channel from the captured image using the mask overlapped with the mask pattern in which the basic pattern with a low correlation for each channel and the weight used for the DNN first layer processing are convoluted. Since the individual configurations used for the combination are the same as those described above, description thereof will be omitted.

5. Second Application Example

When the entire mask is divided into sub-areas, the sub-areas do not necessarily have the same size or shape.

Figure 15:
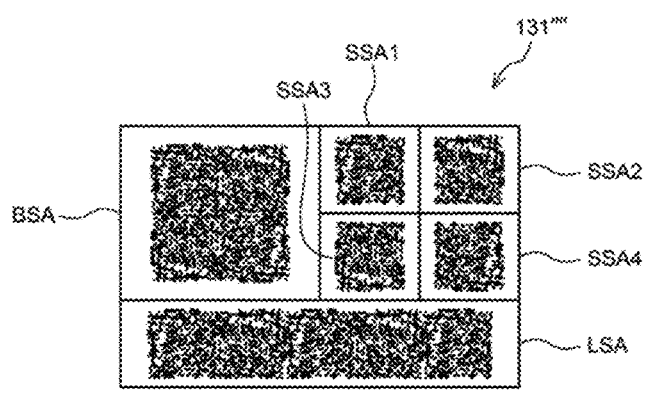
FIG. 15 is a diagram illustrating a second application example of the mask pattern.

For example, as shown as a mask pattern of a mask 131"" in FIG. 15, a sub-area BSA may be disposed in an upper left part of FIG. 15, four sub-areas SSA1 to SSA4 that are similar to the sub-area BSA and have a size of ¼ of a size of the sub-area BSA, that is, a resolution of ¼ may be disposed to the right, and a sub-area LSA that is long in a horizontal direction and has a different shape may be disposed at a bottom part of FIG. 15. Although not illustrated, sub-areas that are long in a vertical direction may be disposed, similarly to the sub-area LSA that are long in the horizontal direction.

The size, shape, and resolution of the sub-areas, for example, are changed in this way, making it possible to allocate resolution according to, for example, importance of the channel or to preferentially increase or decrease the S/N ratio.

6. Example of Execution by Software

Incidentally, a series of processing described above can be executed by hardware, but can also be executed by software. When the series of processing is executed by the software, a program constituting the software is installed in a computer built into dedicated hardware or, for example, a general-purpose computer capable of executing various functions by installing various programs, from a recording medium.

Figure 16:
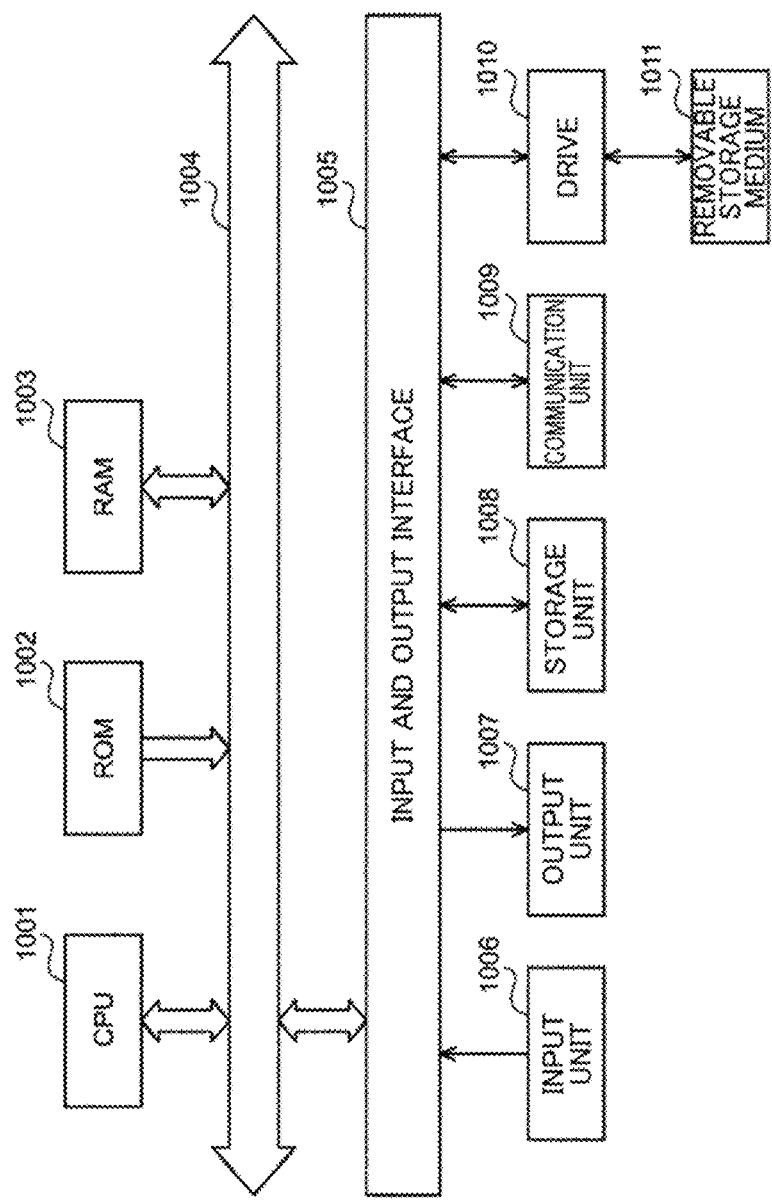
FIG. 16 is a diagram illustrating a configuration example of a general-purpose personal computer.

FIG. 16 illustrates a configuration example of a general-purpose computer. This personal computer includes a central processing unit (CPU) 1001 built therein. An input and output interface 1005 is connected to the CPU 1001 via a bus 1004. A read only memory (ROM) 1002 and a random access memory (RAM) 1003 are connected to the bus 1004.

An input unit 1006 including input devices such as a keyboard and a mouse for the user to input operation commands, an output unit 1007 that outputs a processing operation screen or an image of a processing result to a display device, a storage unit 1008 including, for example, a hard disk drive for storing programs and various data, and a communication unit 1009 that includes a local area network (LAN) adapter or the like and executes communication processing via a network represented by the Internet are connected to the input and output interface 1005. Further, a drive 1010 that reads and writes data from or to a magnetic disk (including a flexible disk), an optical disc (including a compact disc-read only memory (CD-ROM) or a digital versatile disc (DVD)), a magneto-optical disc (including a mini disc (MD)), or a removable storage medium 1011 such as a semiconductor memory is connected.

The CPU 1001 executes various processing according to a program stored in the ROM 1002 or a program read from a removable storage medium 1011 such as a magnetic disk, an optical disc, a magneto-optical disc, or a semiconductor memory, installed in the storage unit 1008, and loaded into a RAM 1003 from the storage unit 1008. The RAM 1003 also appropriately stores, for example, data necessary for the CPU 1001 to execute various processing.

In the computer configured as described above, the CPU 1001 loads, for example, a program stored in the storage unit 1008 into the RAM 1003 via the input and output interface 1005 and the bus 1004, and executes the program so that the series of processing described above are performed.

A program executed by the computer (the CPU 1001) can be provided by being recorded on the removable storage medium 1011 such as a package medium, for example. Further, the program can be provided via a wired or wireless transmission medium such as a local area network, the Internet, or digital satellite broadcasting.

In the computer, the program can be installed in the storage unit 1008 via the input and output interface 1005 by the removable storage medium 1011 being mounted in the drive 1010. Further, the program can be received by the communication unit 1009 via the wired or wireless transmission medium and installed in the storage unit 1008. Further, the program can be installed in the ROM 1002 or the storage unit 1008 in advance.

The program executed by the computer may be a program that is processed in chronological order in an order described in the present specification, or may be a program in which processing is performed in parallel or at a necessary timing such as when a call is made.

The CPU 1001 in FIG. 16 realizes functions of the division unit 161, the Ch1 reconstruction unit 162-1 to the Chin reconstruction unit 162-*m*, and the recognition processing unit 134' in FIG. 5, and the Ch1 reconstruction unit 171-1 to the Chin reconstruction unit 171-*m*, and the recognition processing unit 134' in FIG. 12.

Further, in the present specification, the system means a set of a plurality of components (devices, modules (parts), or the like), and it does not matter whether or not all the components are in the same housing. Therefore, a plurality of apparatuses housed in separate housings and connected via a network, and one apparatus housing a plurality of modules in one housing, are both systems.

The embodiments of the present disclosure are not limited to the embodiments described above, and various changes can be made without departing from the gist of the present disclosure.

For example, the present disclosure can have a configuration of cloud computing in which one function is shared and processed by a plurality of apparatuses via a network.

Further, the respective steps described in the flowchart described above can be executed by one apparatus or can be shared and executed by a plurality of apparatuses.

Further, when one step includes a plurality of processing, the plurality of processing included in the one step can be executed by one apparatus or may be shared and executed by a plurality of apparatuses.

The present disclosure can also take the following configurations.

<1> An image processing apparatus including:
a mask configured to modulate and transmit incident light;
an image sensor configured to capture a modulated image based on the incident light modulated by the mask; and
a signal processing unit configured to perform signal processing based on a mask pattern of the mask on the modulated image.

<2> The image processing apparatus according to <1>,
wherein the signal processing unit performs signal processing based on the mask pattern on the modulated image in a plurality of channels,
the mask pattern is set for each of the channels, and
the pattern set for each channel is a pattern obtained by weighted sum of a binary pattern serving as the basic pattern set for each of the channels and a weight used for signal processing for each of the channels.

<3> The image processing apparatus according to <2>,
wherein the incident light is reflected light reflected from a subject,
the signal processing is image recognition processing for the subject using a deep neural network (DNN), and
the weight is a weight of a first layer of the DNN.

<4> The image processing apparatus according to <3>,
wherein the weight of the first layer of the DNN is learned so that recognition accuracy of the image recognition processing becomes higher, and a degree of similarity between an original image captured by the image sensor in a state in which the modulation by the mask is not applied and a restored image obtained by restoring the modulated image using the weight of the first layer of the DNN becomes lower.

<5> The image processing apparatus according to <2>,
wherein the mask is divided into as many sub-areas as the number of channels, and a pattern for each of the channels is disposed in each of the sub-areas to form the mask pattern.

<6> The image processing apparatus according to <5>,
wherein a margin area configured of a light-shielding area is provided between the sub-areas.

<7> The image processing apparatus according to <6>,
wherein a width of the margin area is set on the basis of a field of view (FOV) of a pixel of the image sensor.

<8> The image processing apparatus according to <5>,
wherein a light shielding wall is provided between the plurality of sub-areas.

<9> The image processing apparatus according to <5>,
wherein sizes and shapes of the plurality of sub-areas are the same.

<10> The image processing apparatus according to <5>,
wherein sizes and shapes of the plurality of sub-areas are not the same.

<11> The image processing apparatus according to <5>,
wherein the basic patterns set for each of the channels constituting the patterns disposed in the respective sub-areas are set to have no correlation or a correlation lower than a predetermined correlation.

<12> The image processing apparatus according to <5>,
wherein the basic patterns set for each of the channels constituting the patterns disposed in the respective sub-areas are set to have no correlation or a correlation lower than a predetermined correlation using a pseudo-random signal.

<13> The image processing apparatus according to <2>,
wherein the mask pattern is obtained by overlapping the patterns set for each of the channels.

<14> The image processing apparatus according to <13>,
wherein the basic patterns set for each of the channels are set to have no correlation or a correlation lower than a predetermined correlation.

<15> The image processing apparatus according to <14>, wherein the basic patterns set for each of the channels are set to have no correlation or a correlation lower than a predetermined correlation using a pseudo-random signal.

<16> The image processing apparatus according to <2>, wherein the mask is divided into as many sub-areas as the number of channels;
patterns of the plurality of channels are arranged in each of the sub-areas,
The pattern for each sub-area is obtained by overlapping patterns corresponding to a plurality of channels.

<17> The image processing apparatus according to any one of <1> to <16>, wherein
the mask pattern consists of transmission, light shielding, and any intermediate value.

<18> The image processing apparatus according to any one of <1> to <16>, wherein
the mask pattern is configured of a diffraction grating.

<19> An image processing method for an image processing apparatus including:
a mask configured to modulate and transmit incident light,
an image sensor configured to capture a modulated image based on the incident light modulated by the mask, and
a signal processing unit configured to apply signal processing based on a mask pattern of the mask to the modulated image,
wherein the signal processing unit performs signal processing based on the mask pattern of the mask on the modulated image.

<20> A program for causing a computer configured to control an image processing apparatus including
a mask configured to modulate and transmit incident light, and
an image sensor configured to capture a modulated image based on the incident light modulated by the mask to function as:
a signal processing unit configured to perform signal processing based on a mask pattern of the mask on the modulated image.

REFERENCE SIGNS LIST 101, 111 Image processing apparatus
131, 131' to 131"" Mask
132 Image sensor
133 Reconstruction unit
134, 134' Recognition processing unit
151-2 to 151-n, 151-1-2 to 151-1-n, 151-2-2 to 151-2-n, . . . , 151-m-2 to 151-m-n DNN second Layer processing unit to DNN n-th layer processing unit
152, 152' Recognition unit
171-1 to 171-m Ch1 reconstruction unit to Chin reconstruction unit

The invention claimed is:

1. An image processing apparatus, comprising:
a mask configured to modulate and transmit incident light;
an image sensor configured to capture a modulated image based on the incident light modulated by the mask; and
a central processing unit (CPU) configured to perform, in a plurality of channels, a signal processing operation based on a specific mask pattern on the modulated image, wherein
the specific mask pattern for each channel is a pattern obtained as a weighted sum of a binary pattern serving as a basic pattern for each of the plurality of channels and a weight used for the signal processing operation for each of the plurality of channels.

2. The image processing apparatus according to claim 1, wherein
the incident light is reflected light reflected from a subject,
the signal processing operation is an image recognition processing operation for the subject using a deep neural network (DNN), and
the weight is a weight of a first layer of the DNN.

3. The image processing apparatus according to claim 2, wherein the weight of the first layer of the DNN is learned so that recognition accuracy of the image recognition processing operation becomes higher, and a degree of similarity between an original image captured by the image sensor in a state in which the modulation by the mask is not applied and a restored image obtained by a restoring operation of the modulated image using the weight of the first layer of the DNN becomes lower.

4. The image processing apparatus according to claim 1, wherein
the mask is divided into as many sub-areas as a number of channels, and
the specific mask pattern is based on a pattern for each of the plurality of channels in each of the sub-areas.

5. The image processing apparatus according to claim 4, wherein
a margin area is a light-shielding area, and
the margin area is between the sub-areas.

6. The image processing apparatus according to claim 5, wherein a width of the margin area is based on a field of view (FOV) of a pixel of the image sensor.

7. The image processing apparatus according to claim 4, wherein a light shielding wall is between the sub-areas.

8. The image processing apparatus according to claim 4, wherein sizes and shapes of the sub-areas are the same.

9. The image processing apparatus according to claim 4, wherein sizes and shapes of the sub-areas are not the same.

10. The image processing apparatus according to claim 4, wherein basic patterns, of the plurality of channels constituting patterns in the respective sub-areas, have no correlation or a correlation lower than a specific correlation.

11. The image processing apparatus according to claim 4, wherein basic patterns, of the plurality of channels constituting patterns in the respective sub-areas, have no correlation or a correlation lower than a specific correlation using a pseudo-random signal.

12. The image processing apparatus according to claim 1, wherein a mask pattern is obtained by an overlapping operation of the specific mask pattern for the each of the plurality of channels.

13. The image processing apparatus according to claim 12, wherein the basic pattern for the each of the plurality of channels have no correlation or a correlation lower than a specific correlation.

14. The image processing apparatus according to claim 12, wherein the basic pattern for the each of the plurality of channels have no correlation or a correlation lower than a specific correlation using a pseudo-random signal.

15. The image processing apparatus according to claim 1, wherein
the mask is divided into as many sub-areas as a number of channels,
mask patterns of the plurality of channels are in each of the sub-areas, and
a mask pattern for each sub-area is obtained by an overlapping operation of the mask patterns of the plurality of channels.

16. The image processing apparatus according to claim 1, wherein the specific mask pattern consists of a transmission area, a light shielding area, and an intermediate transmissive area.

17. The image processing apparatus according to claim 1, wherein the specific mask pattern is a diffraction grating.

18. An image processing method, comprising:
- modulating and transmitting, by a mask, incident light;
- capturing, by an image sensor, a modulated image based on the incident light modulated by the mask; and
- performing, by a central processing unit (CPU), in a plurality of channels, a signal processing operation based on a specific mask pattern to the modulated image, wherein
  - the specific mask pattern for each channel is a pattern obtained as a weighted sum of a binary pattern serving as a basic pattern for each of the plurality of channels and a weight used for the signal processing operation for each of the plurality of channels.

19. A non-transitory computer-readable medium having stored thereon, computer-executable instructions which, when executed by, cause the computer to execute operations, the operations comprising:
- modulating and transmitting, by a mask, incident light, and
- capturing, by an image sensor, a modulated image based on the incident light modulated by the mask; and
- performing, by a central processing unit (CPU), in a plurality of channels, a signal processing operation based on a specific mask pattern on the modulated image, wherein
  - the specific mask pattern for each channel is a pattern obtained as a weighted sum of a binary pattern serving as a basic pattern for each of the plurality of channels and a weight used for the signal processing operation for each of the plurality of channels.

\* \* \* \* \*